United States Patent

Domanski et al.

[11] Patent Number: 5,865,091
[45] Date of Patent: Feb. 2, 1999

[54] PISTON ASSEMBLY FOR STIRLING ENGINE

[75] Inventors: Christopher E. Domanski, Petersburg; William H. Houtman; Benjamin Ziph, both of Ann Arbor, all of Mich.

[73] Assignee: STM, Corporation, Ann Arbor, Mich.

[21] Appl. No.: 892,365

[22] Filed: Jul. 14, 1997

[51] Int. Cl.[6] .................................. F16J 1/00; F01B 29/10
[52] U.S. Cl. .............................. 092/177; 92/192; 92/194; 92/242; 92/247; 60/517
[58] Field of Search .......................... 60/517, 521, 525, 60/526; 92/177, 182, 192, 193, 194, 200, 240, 242, 247, 299

[56] References Cited

U.S. PATENT DOCUMENTS

| 3,442,183 | 5/1969 | Howe et al. | 92/193 X |
| 4,270,440 | 6/1981 | Lewis, II | 92/194 X |
| 4,452,042 | 6/1984 | Lindskoug . | |
| 4,615,261 | 10/1986 | Meijer . | |
| 4,669,736 | 6/1987 | Meijer . | |
| 4,736,586 | 4/1988 | Kawajiri et al. . | |
| 4,998,460 | 3/1991 | Wolfs et al. | 60/517 X |
| 5,056,419 | 10/1991 | Watanabe et al. | 60/517 X |

*Primary Examiner*—Hoang Nguyen
*Attorney, Agent, or Firm*—Harness, Dickey & Pierce P.L.C.

[57] ABSTRACT

A piston assembly for a double-acting engine such as a double-acting Stirling engine. A pair of sealing rings located on opposite sides of a sealing washer are positioned between a base section and a dome section of a piston head. These sealing rings are alternatively urged into sealing engagement with the cylinder bore as the piston reciprocates. A single sealing ring design is also disclosed in which the sealing ring is urged into constant sealing engagement by positive pressure accumulated with an interior cavity in the piston head.

23 Claims, 20 Drawing Sheets

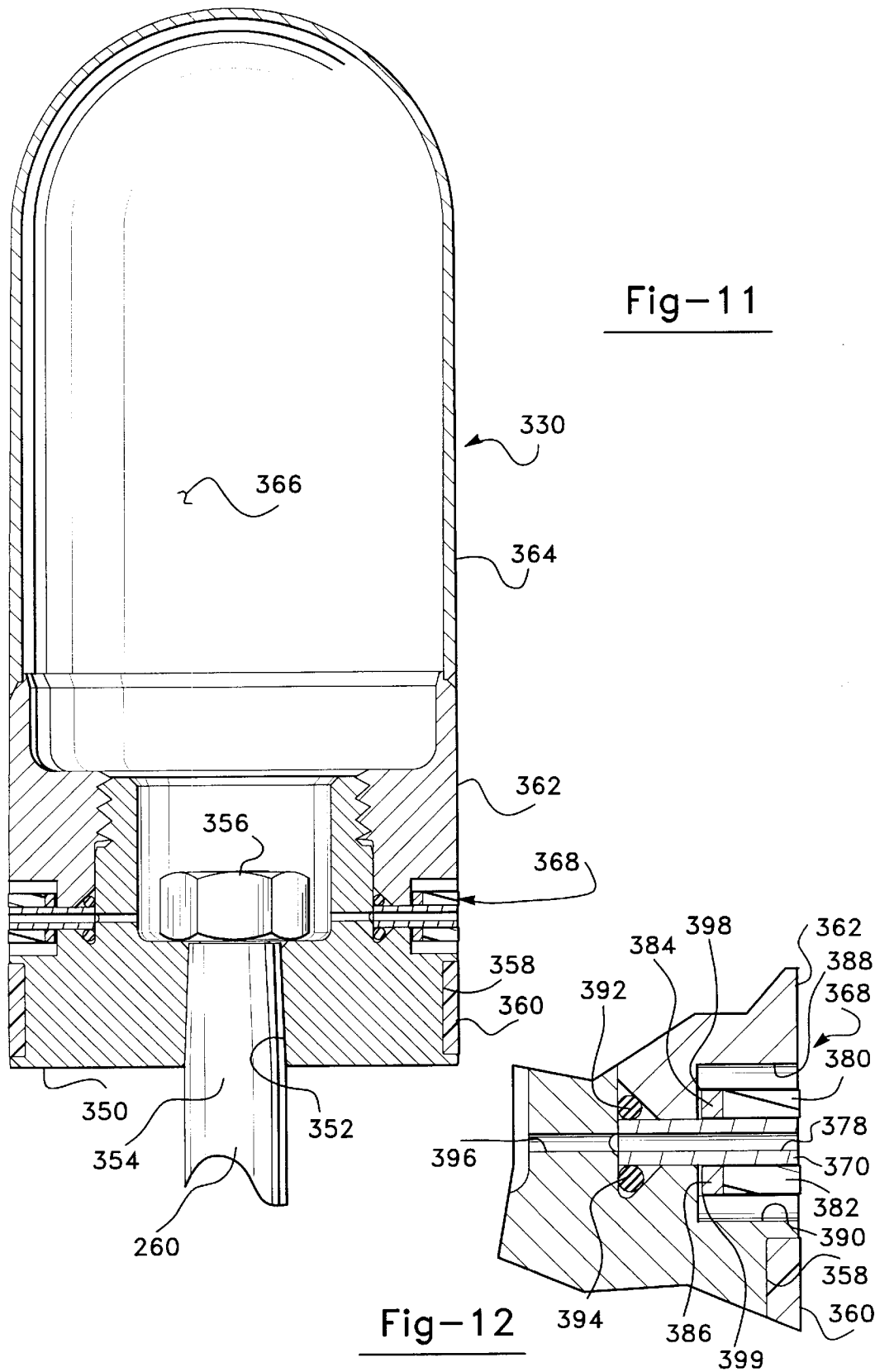

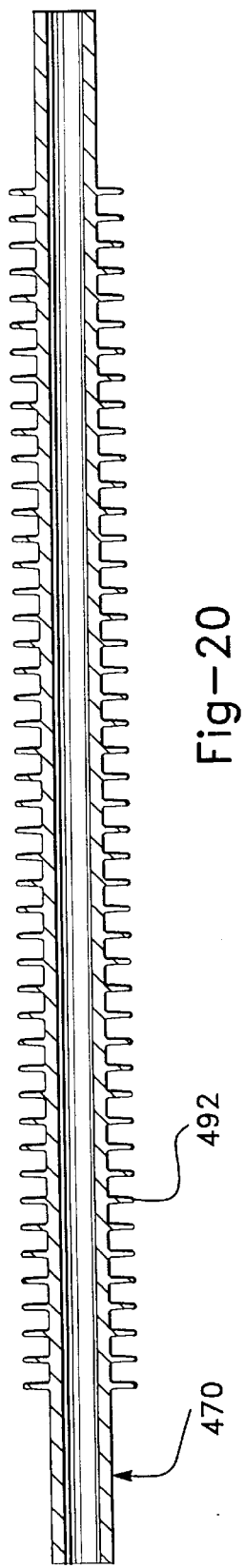
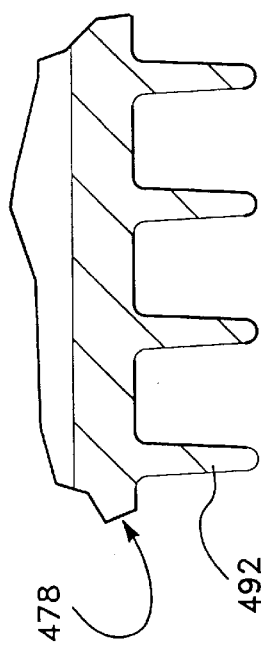
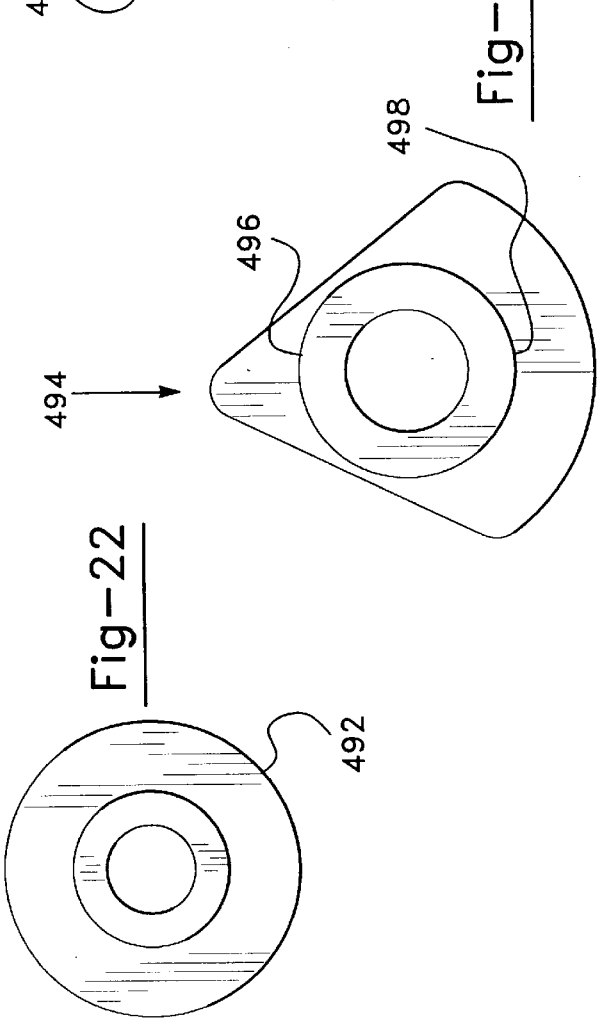

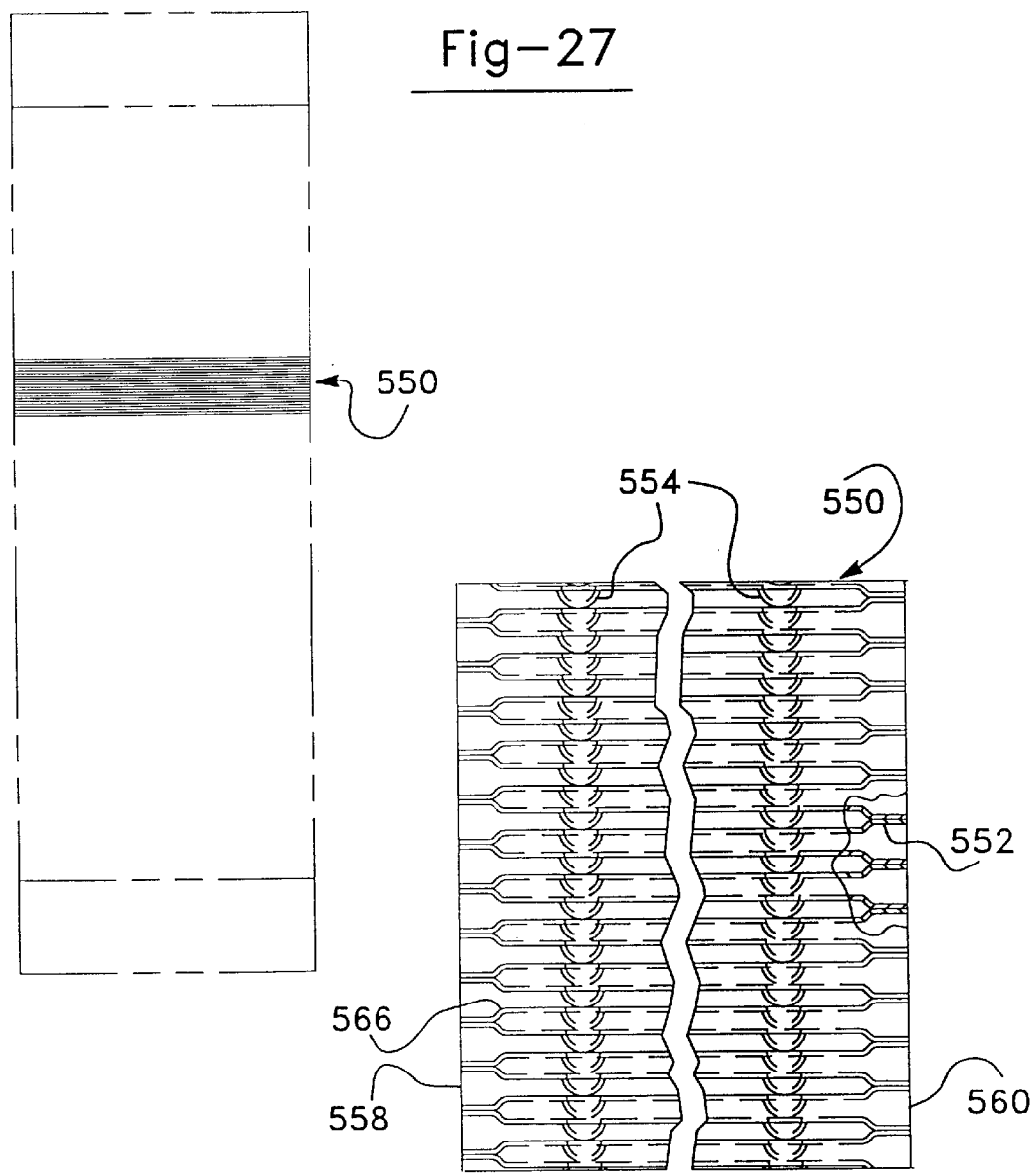

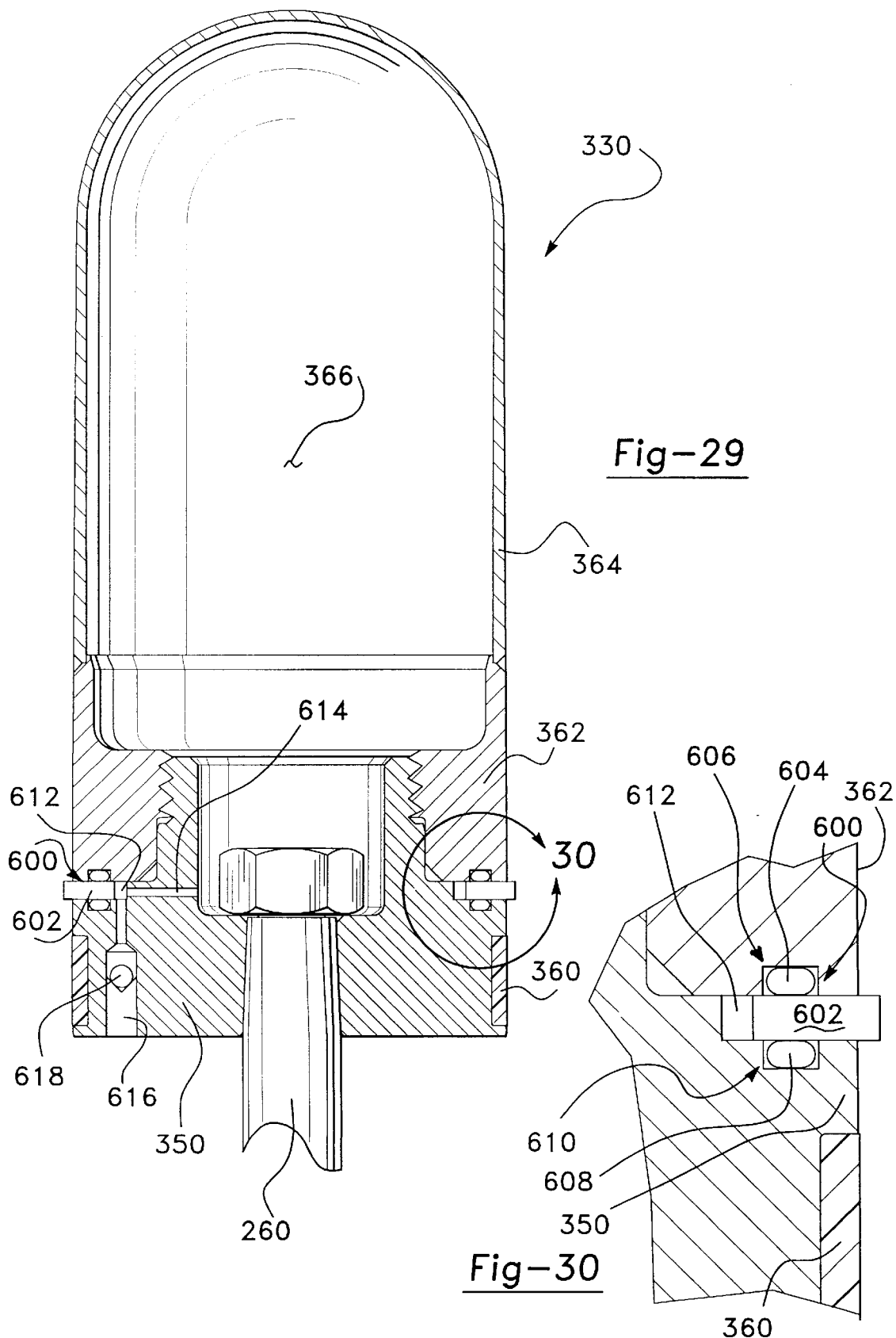

PISTON ASSEMBLY FOR STIRLING ENGINE

BACKGROUND AND SUMMARY OF THE INVENTION

This invention is related to a heat engine and particularly to an improved Stirling cycle engine incorporating numerous refinements and design features intended to enhance engine performance, manufacturability, and reliability.

The basic concept of a Stirling engine dates back to a patent registered by Robert Stirling in 1817. Since that time, this engine has been the subject of intense scrutiny and evaluation. Various Stirling engine systems have been prototyped and put into limited operation throughout the world. One potential application area for Stirling engines is for automobiles as a prime mover or engine power unit for hybrid electric applications. Such applications place extreme demands on Stirling engine design. Due to the wide acceptance of spark ignition and Diesel engines, to gain acceptance, a Stirling engine must show significant advantages over those types, such as a dramatic enhancement in fuel efficiency or other advantages. In addition, reliability and the ability to manufacture such an engine at a low cost are of paramount importance in automotive applications. Similar demands are present in other fields of potential use of a Stirling engine such as stationary auxiliary power units, marine applications, solar energy conversion, etc.

Stirling engines have a reversible thermodynamic cycle and therefore can be used as a means of delivering mechanical output energy from a source of heat, or acting as a heat pump through the application of mechanical input energy. Using various heat sources such as combusted fossil fuels or concentrated solar energy, mechanical energy can be delivered by the engine. This energy can be used to generate electricity or be directly mechanically coupled to a load. In the case of a motor vehicle application, a Stirling engine could be used to directly drive traction wheels of the vehicle through a mechanical transmission. Another application in the automotive environmental is for use with a so-called "hybrid" vehicle in which the engine drives an alternator for generating electricity which charges storage batteries. The batteries drive the vehicle through electric motors coupled to the traction wheels. Perhaps other technologies for energy storage could be coupled to a Stirling engine in a hybrid vehicle such as flywheel or thermal storage systems, etc.

The Assignee of the present application, Stirling Thermal Motors, Inc. has made significant advances in the technology of Stirling machines through a number of years. Examples of such innovations include development of a compact and efficient basic Stirling machine configuration employing a parallel cluster of double acting cylinders which are coupled mechanically through a rotating swashplate. In many applications, a swashplate actuator is implemented to enable the swashplate angle and therefore the piston stroke to be changed in accordance with operating requirements.

Although the Assignee has achieved significant advances in Stirling machine design, there is a constant need to further refine the machine, particularly if the intended application is in large volume production. For such applications, for example motor vehicles, great demands are placed on reliability and cost. It is well known that motor vehicle manufacturers around the world have made great strides in improving the reliability of their products. The importance of a vehicle engine continuing to operate reliably cannot be overstated. If a Stirling engine is to be seriously considered for motor vehicle applications, it must be cost competitive with other power plant technologies. This is a significant consideration given the mature technology of the spark ignition and Diesel internal combustion engines now predominately found in motor vehicles today.

In the past several decades significant improvements in exhaust pollution and fuel economy have been made for spark ignition and Diesel engines. However, there are fundamental limits to the improvements achievable for these types of internal combustion engines. Due to the high temperature intermittent combustion process which takes place in internal combustion engines, pollutants are a significant problem. Particularly significant are $NO_x$ and CO emissions. Although catalytic converters, engine control, and exhaust treatment technologies significantly improve the quality of emissions, there remains room for improvement. Fuel efficiency is another area of concern for the future of motor vehicles which will require that alternative technologies be studied seriously. It is expected that the ultimate thermal efficiency achievable with the spark ignition internal combustion engines is on the order of 20%, with Diesel engines marginally exceeding this value. However, in the case of Stirling engines, particularly if advanced ceramic or other high temperature materials are implemented, thermal efficiencies in the neighborhood of 40% to 50% appear achievable. The external combustion process which could be implemented in an automotive Stirling engine would provide a steady state combustion process which allows precise control and clean combustion. Such a combustion system allows undesirable pollutants to be reduced.

In view of the foregoing, there is a need to provide a Stirling cycle engine having design features enabling it to be a viable candidate for incorporation into large scale mass production such as for automobiles and for other applications. The present invention relates to features for a Stirling engine which achieve these objects and goals.

The Stirling engine of the present invention bears many similarities to those previously developed by Assignee, including those described in U.S. Pat. Nos. 4,481,771; 4,532,855; 4,615,261; 4,579,046; 4,669,736; 4,836,094; 4,885,980; 4,707,990; 4,439,169; 4,994,004; 4,977,742; 4,074,114 and 4,966,841, which are hereby incorporated by reference. Basic features of many of the Stirling machines described in the above referenced patents are also implemented in connection with the present invention.

The Stirling engine in accordance with the present invention has a so called "modular" construction. The major components of the engine, comprising the drive case and cylinder block, are bolted together along planar mating surfaces. Piston rod seals for the pistons traverse this mating plane. A sliding rod seal can be used which is mounted either to the drive case or cylinder block. The rod seal controls leakage of the high pressure engine working gas at one end of the rod to atmosphere. Sliding contact rod seals provide adequate sealing for many applications. For example, in an automotive engine such an approach might be used. The sliding contact seal would, however, inevitably allow some leakage of working fluid, if only on a molecular level. In solar energy conversion or other applications where the engine must operate for extremely long lives, other types of sealing technology may be necessary to provide a hermetic, i.e. non-leaking seal. In the engine of this invention, if other rod sealing approaches are required, it would be a simple matter to insert a plate between the drive case and cylinder block which supports a bellows or other type of hermetic sealing element. Thus the same basic engine componentry could be implemented for various applications.

The Stirling engine of the present invention further includes a number of features which enable it to be manufactured efficiently in terms of component costs, processing, and parts assembly. The drive case and cylinder block feature a number of bores and passageways which can be machined at 90° from their major mounting face surfaces, thus simplifying machining processes. Designs which require castings to be machined at multiple compound angles and with intersecting passageways place more demands on production machinery, tools, and operators, and therefore negatively impact cost.

The Stirling engine according to this invention provides a number of features intended to enhance its ease of assembly. An example of such a feature is the use of a flat top retaining plate which mounts the cylinder extensions and regenerator housings of the engine in place on the cylinder block. The use of such flat surfaces and a single piece retaining plate simplifies machining and assembly. The retaining plate design further lowers cost by allowing a reduction in the high temperature alloy content of the engine. Furthermore, the one piece retaining plate provides superior component retention as compared with separate retainers for each cylinder extension and regenerator housing.

In many past designs of Stirling engines, a large volume of the engine housing is exposed to the high working pressures of the working gas. For example, in many of the Assignees prior designs, the entire drive case was subject to such pressures. For such designs, the entire housing might be considered a "pressure vessel" by certifying organizations and others critically evaluating the engine from the perspective of safety concerns. Thus, the burst strength of the housing may need to be dramatically increased. This consideration would greatly increase the cost, weight, and size of the machine. In accordance with the engine of the present invention, the high pressure working fluid is confined to the extent possible to the opposing ends of the cylinder bores and the associated heat transfer devices and passageways. Thus the high pressure gas areas of the Stirling engine of this invention are analogous to that which is encountered in internal combustion engines, and therefore this Stirling engine can be thought of in a similar manner in terms of consideration for high pressure component failure. This benefit is achieved in the present invention by maintaining the drive case at a relatively low pressure which may be close to ambient pressure, while confining the high pressure working fluid within the cylinder block and the connected components including the cylinder extension, regenerator housing, and heater head.

As a means of enhancing the degree of control of operation of the Stirling engine of this invention, a variable piston stroke feature is provided. In order to achieve this, some means of adjusting the swashplate angle is required. In many past designs, hydraulic actuators were used. These devices, however, consume significant amounts of energy since they are always activated and tend to be costly to build and operate. This invention encompasses two versions of electric swashplate actuators. A first version features a rotating motor which couples to the swashplate drive through a planetary gear set. A second embodiment incorporates a stationary mounted motor which drives the actuator through a worm gear coupled to a pair of planetary gear sets. In both cases, a high gear reduction is achieved, which through friction in the mechanically coupled element, prevents the actuator from being back-driven and thus a swashplate angle can be maintained at a set position without continuously energizing the drive motor. Power is applied to the drive motor only when there is a need to change the swashplate angle and hence piston stroke.

The pistons of the engine are connected to cross heads by piston rods. The cross heads of the engine embrace the swashplate and convert the reciprocating movement of the piston connecting rods and pistons to rotation of the swashplate. The Stirling engine of this invention implements a pair of parallel guide rods mounted within the drive case for each cross head. The cross heads feature a pair of journals which receive the guide rods.

The cross heads include sliders which engage both sides of the swashplate. The clearance between the sliders and the swashplate surfaces is very critical in order to develop the appropriate hydrodynamic lubricant film at their interfaces. An innovative approach to providing a means of adjusting the cross head bearing clearances is provided in accordance with the present invention.

This invention further encompasses features of the piston assemblies which include a sealing approach which implements easily machined elements which provide piston sealing. In one embodiment, a pair of sealing rings are used and they are subjected to fluid forces such that only one of the sealing rings is effective in a particular direction of reciprocation of the piston. This approach reduces friction, provides long ring life and enhances sealing performance. In another embodiment, a single sealing ring is used. This approach greatly reduces the number of required components in the piston assembly, simplifies the process of manufacturing the piston assembly, reduces the amount of leakage across the piston ring assembly, and reduces the amount of friction caused by the piston ring assembly.

The combustion exhaust gases after passing through the heater head of the engine still contain useful heat. It is well known to use an air preheater to use this additional heat to heat incoming combustion air as a means of enhancing thermal efficiency. In accordance with this invention, an air preheater is described which provides a compact configuration with excellent thermal efficiency. The surfaces of the preheater exposed to combustion gases can be coated with a catalyst material such as platinum, palladium or other elements or compounds which enable the combustion process to be further completed, thus generating additional thermal energy. The catalyst further reduces exhaust emissions as they do for today's internal combustion engines.

The Stirling engine of this invention incorporates a heater assembly with a number of tubes which are exposed to combustion gases enabling the heat of combustion to be transferred to the working gas within the engine. The typical approach toward constructing such a heater assembly is to painstakingly bend tubing to the proper configuration with each tube having a unique shape. Such an approach is ill-suited for volume production. The requirement of using bent tubing also places significant limitations on heater performance. Material selections are limited since it must have adequate ductility to enable tube stock formed in straight runs or coils to be bent to the proper shape. Such tubing also has a uniform wall thickness and cannot readily be incorporated with external fins to enhance heat transfer area without welding or braising additional parts to the outside of the tube. These steps add to cost and complexity. Moreover, when braising materials are used, temperature limits are placed on the heater tubes to avoid failure of these joints. This temperature limitation also reduces thermal efficiency which tends to increase with combustion temperature. In accordance with this invention, cast heater tubes are provided which can be made in multiples of the same configuration connected together through a manifold. The cast material allows the heater tubes to be subjected to much higher temperatures. In addition, special configurations can be provided to enhance performance. For example, fins of various cross-sectional shape can be provided. Also, the fins need not have a rotationally symmetric configuration, but instead can be designed to consider the fluid mechanics of the fluids moving across them. Through appropriate fin design, it is believed possible to cause the entire perimeter of the heater tubes to be a near uniform temperature despite the fact that fluids are flowing transversely across them. Temperature gradients associated with prior heater tube designs place significant thermal stresses on the tubes, which over time, lead to mechanical fatigue failure.

In the Stirling engine of the type according to the present invention employing four double acting cylinders, there are four discrete volumes of working gas which are isolated from one another (except by leakage across the pistons). In order to enable the engine to operate smoothly and with minimal force imbalances, the mean pressure of each of these four volumes need to be equalized. In accordance with this invention, this is achieved by connecting together the four volumes through capillary tubes. In addition, a system is provided for determining that the mean pressure in each cycle is within a predetermined range. Upon the occurrence of a component failure causing leakage, a significant imbalance could result which could have a destructive effect on the engine. The Stirling engine according to this invention features a pressure control system which unloads the engine upon the occurrence of such failure.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 11 is a longitudinal cross-sectional view through the piston assembly showing a first embodiment of this invention;

FIG. 12 is an enlarged partial cross-sectional view particularly showing the piston ring assembly from the first embodiment of this invention;

FIG. 20 is a longitudinal cross-sectional view of a heater tube from the heater head assembly;

FIG. 21 is an enlarged partial cross-sectional view showing particularly the fin configuration of the heater tube;

FIG. 22 is a plan view of one of the fins of the heater tube shown in FIG. 20;

FIG. 23 is a plan view of an alternate configuration of a fin shape for a heater tube according to this invention;

FIG. 27 is a side view of the air preheater shown in FIG. 25;

FIG. 28 is an enlarged side view particularly showing the alternately welded configuration of the adjacent leaves of the preheater;

FIG. 29 is longitudinal cross-sectional view through the piston assembly showing an alternative embodiment of the inventive piston assembly;

FIG. 30 is an enlarged partial cross-sectional view particularly showing the piston ring assembly from the alternative embodiment of this invention.

DETAILED DESCRIPTION OF THE INVENTION

Figure 1:
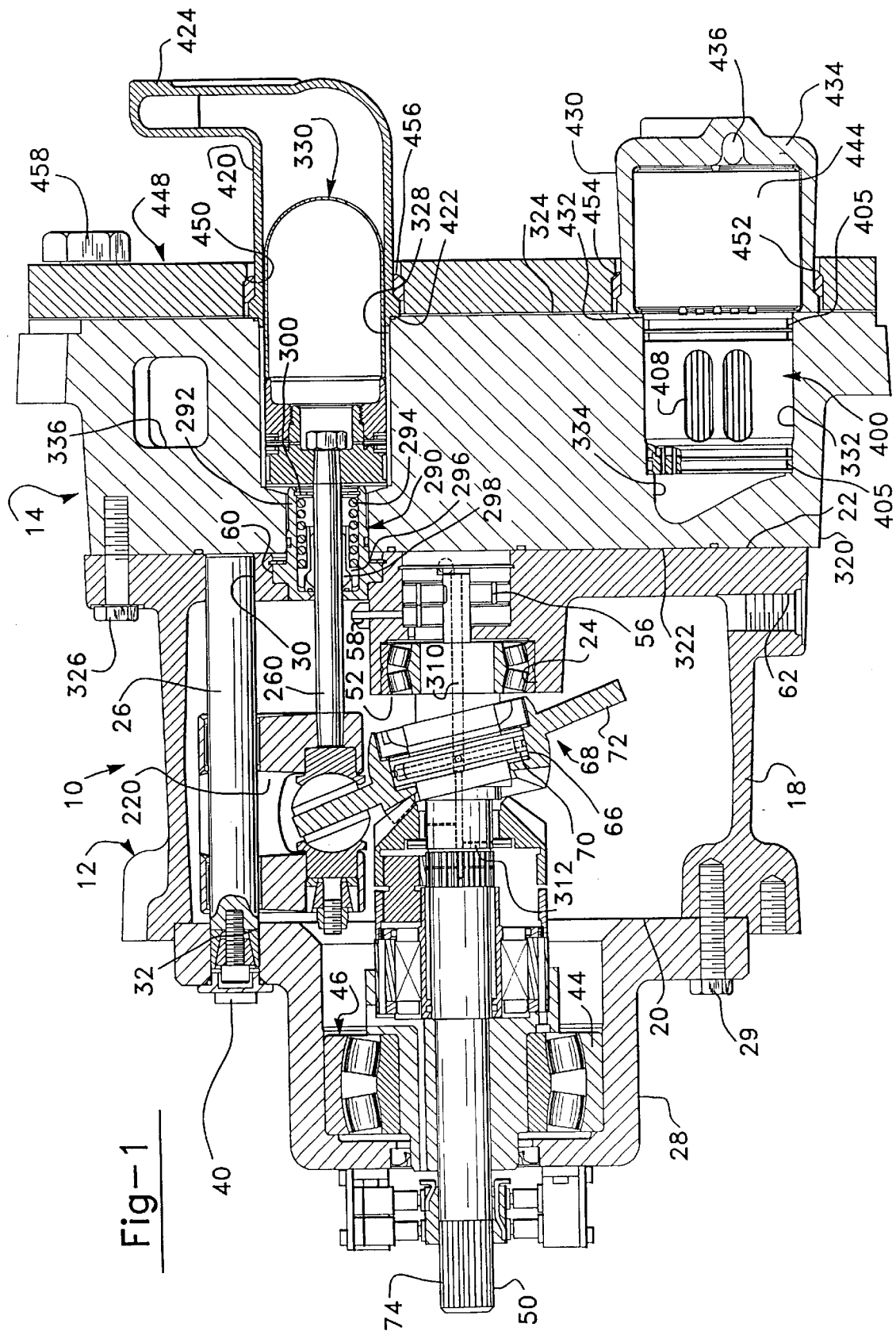
FIG. 1 is a longitudinal cross-sectional view through a Stirling engine in accordance with this invention.

A Stirling engine in accordance with this invention is shown in a completely assembled condition in FIG. 1 and is generally designated by reference number 10. Stirling engine 10 includes a number of primary components and assemblies including drive case assembly 12, cylinder block assembly 14, and heater assembly 16.

OVERALL CONSTRUCTION

Drive case assembly 12 includes a housing 18 having a pair of flat opposed mating surfaces 20 and 22 at opposite ends. Mating surface 20 is adapted to receive drive shaft housing 28 which is bolted to the drive case housing 18 using threaded fasteners 29. Mating surface 22 is adapted to be mounted to cylinder block assembly 14. Drive case housing 18 has a hollow interior and includes a journal 24 for mounting a drive shaft bearing. Arranged around the interior perimeter of drive case housing 18 is a series of cross head guide rods 26. A pair of adjacent guide rods 26 is provided for each of the four cross heads of the engine (which are described below). As will be evident from a further description of Stirling engine 10, it is essential that adjacent guide rods 26 be parallel within extremely close tolerances.

Figure 3:
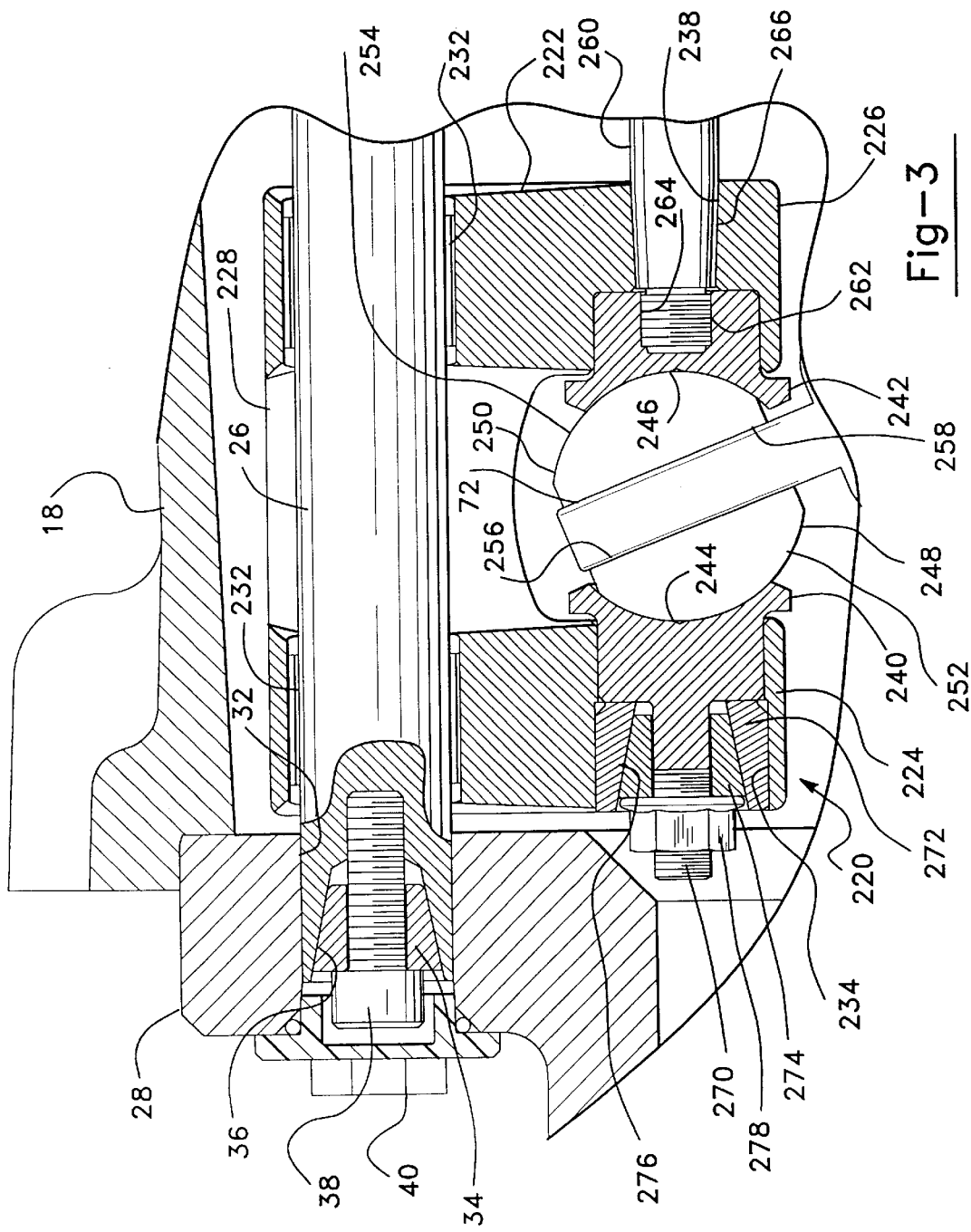
FIG. 3 is an enlarged cross-sectional view taken from FIG. 1 showing in greater detail the cross head assembly of the engine of this invention.

One end of each guide rod 26 is mounted within bores 30 of drive case housing 18. The opposite ends of guide rods 26 are received in bores 32 of drive shaft housing 28. The mounting arrangement for guide rods 26 is shown in FIGS. 1 and 3. One end of each guide rod 26 has a conical configuration bore 36 which terminates at a blind threaded bore. In addition, a series of slits are placed diametrically through the end of guide rods 26 at bore 36 so that guide rod end has limited hoop strength. Cone 34 is inserted within conical bore 36. A threaded fastener such as cap screw 38 is threaded into the threaded bore at the end of guide rod 26. By torquing threaded fastener 38, cone 34 is driven into bore 36 causing the end of guide rod 26 to expand into mechanical engagement with bore 32. This is achieved without altering the concentricity between the longitudinal axis of guide rod 26 and guide rod bores 30 and 32. Cap 40 seals and protects bore 32 and retains lubricating oil within the drive case.

Centrally located within drive shaft housing 28 is journal 44 which provides an area for receiving spherical rolling bearing assembly 46 which is used for mounting drive shaft 50. At the opposite end of drive shaft 50 there is provided spherical roller bearing assembly 52 mounted in journal 24. Spherical bearing configurations are provided for bearing assemblies 46 and 52 to accommodate a limited degree of bending deflection which drive shaft 50 experiences during operation. Drive case housing 18 also provides a central cavity within which oil pump 56 is located. Oil pump 56 could be of various types but a gerotor type would be preferred. Through drilled passageways, high pressure lubricating oil is forced into spray nozzle 58 which sprays a film of lubricant onto the piston rods 260 (described below). In addition, lubricant is forced through internal passages within drive shaft 50, as will be explained in greater detail later.

Drive case 18 further defines a series of four counterbored rod seal bores 60. At a position which would correspond with the lower portion of drive case 18, a sump port 62 is provided. The lubrication system of engine 10 can be characterized as a dry sump type with oil collecting in the interior cavity of drive case 18 being directed to oil pump and returned via suction of oil pump 56, where it is then pumped to various locations and sprayed as mentioned previously.

Drive shaft 50 is best described with reference to FIG. 1. Drive shaft 50 incorporates a variable angle swashplate mechanism. Drive shaft 50 includes an annular swashplate carrier 66 which is oriented along a plane tipped with respect to the longitudinal axis of drive shaft 50. Swashplate 68 in turn includes an annular interior cavity 70 enabling it to be mounted onto swashplate carrier 66. Bearings enable swashplate 68 to be rotated with respect to drive shaft swashplate carrier 66. Swashplate disc 72 is generally circular and planer but is oriented at an angle inclined with respect to that of swashplate cavity 70. By rotating swashplate 68 with respect to drive shaft 50, the angle defined by the plane of disc 72 and the longitudinal axis of drive shaft 50 can be changed from a position where they are perpendicular, to other angular orientations. Thus, rotation of drive shaft 50 causes disc 72 to rotate about an inclined axis. This basic swashplate configuration is a well known design implemented by the Assignee in prior Stirling engine configurations. Drive shaft 50 includes splined end 74 enabling it to be coupled to a load, which as previously stated, may be of various types. Two embodiments of actuators for changing the swashplate angle in a desired manner will be described later.

SWASHPLATE ACTUATOR

Figure 4:
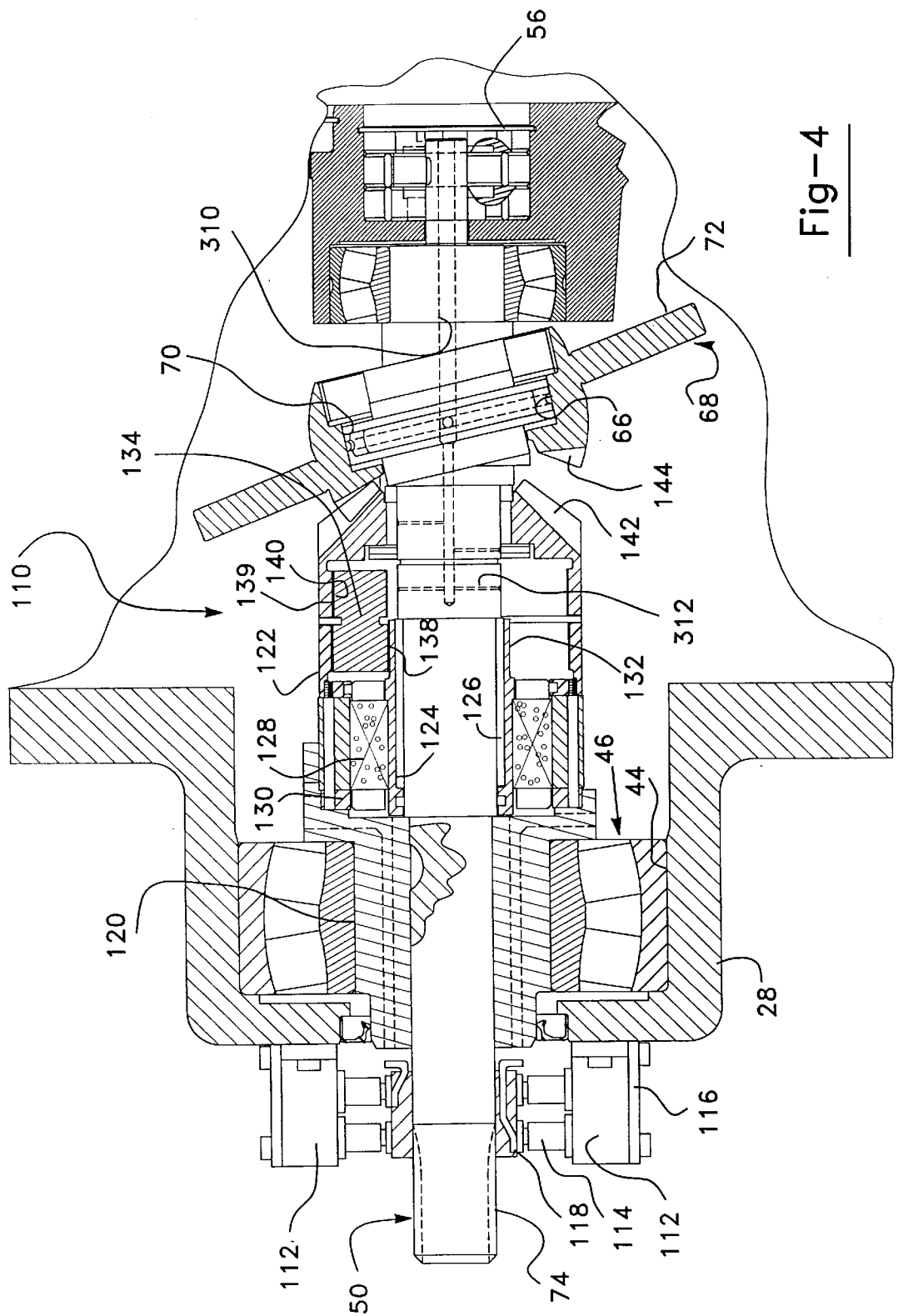
FIG. 4 is a partial cross-sectional view showing an electric swashplate actuator in accordance with a first embodiment of this invention.

A first embodiment of an electric swashplate actuator in accordance with this invention is best shown with reference to FIG. 1 and 4, and is generally designated by reference number 110. Actuator 110 uses a DC torque motor, a planetary gear system, and bevelled gears to accomplish control over swashplate angle. With this embodiment of electric swashplate actuator 110, it is necessary to communicate electrical signals to rotating components. To achieve this, two pairs of slip ring assemblies 112 are provided. Two pairs are provided for redundancy since it is only necessary for one pair to apply electrical power. Each slip ring assembly 112 includes a pair of spring biased brushes 114 mounted to a carrier 116 attached to drive shaft housing 28. Electrical signals are transmitted into slip rings 118 directly attached to drive shaft 50. Electrical conductors are connected to slip rings 118 and run through bearing mount 120 which is keyed to drive shaft 50 such that relative rotation is not possible between these two parts. Bearing mount 120 is connected with motor stator 122 having a number of permanent magnets (not shown) mounted thereto. The motor rotor 124 is journalled onto drive shaft 50 using needle bearing elements 126 such that they can rotate relative to one another. Electrical signals are transmitted to rotor 124 and its windings 128 via a second set of brushes 130. Accordingly, through the application of DC electrical signals through slip ring assemblies 112, electrical signals are transmitted to rotor windings 128 and thus the rotor can rotate relative to drive shaft 50. By applying voltage in the proper polarity, rotor 124 can be rotated in either direction as desired.

Actuator rotor 124 includes an extension defining sun gear 132. Three planet gears 134 mesh with sun gear 132 and also with teeth formed by stator extension 122 defining a ring gear which is fixed such that it does not rotate relative to shaft 50. Thus, as rotor 124 rotates relative to shaft 50, planet gears 134 orbit. Planet gears 134 feature two sections, the first section 138 meshing with sun gear 132, and a second section 139 having a fewer number of teeth meshing with ring gear 140. Revolution of the planet gear 134 causes rotation of ring gear 140 relative to drive shaft 50. Ring gear 140 is directly coupled to a bevel gear 142 which engages a bevel gear surface 144 of swashplate 68. As explained previously, relative rotation of swashplate 68 relative to drive shaft 50 causes an effective change in swashplate angle.

In normal operation, electric actuator 110 is not energized, therefore, sun gear 132 is stationary relative to drive shaft 50. Ring gear 140 is driven by swashplate 68 and both rotate at the same speed. Planet gears 134 carry the torque from ring gear 140 to sun gear 132 and stator ring gear 136. These then carry the torque to bearing mount 120 which in turn carries the torque to shaft 50. Therefore, except when actuated, there is no movement of the gears of electric actuator 110 relative to one another.

Figure 5:
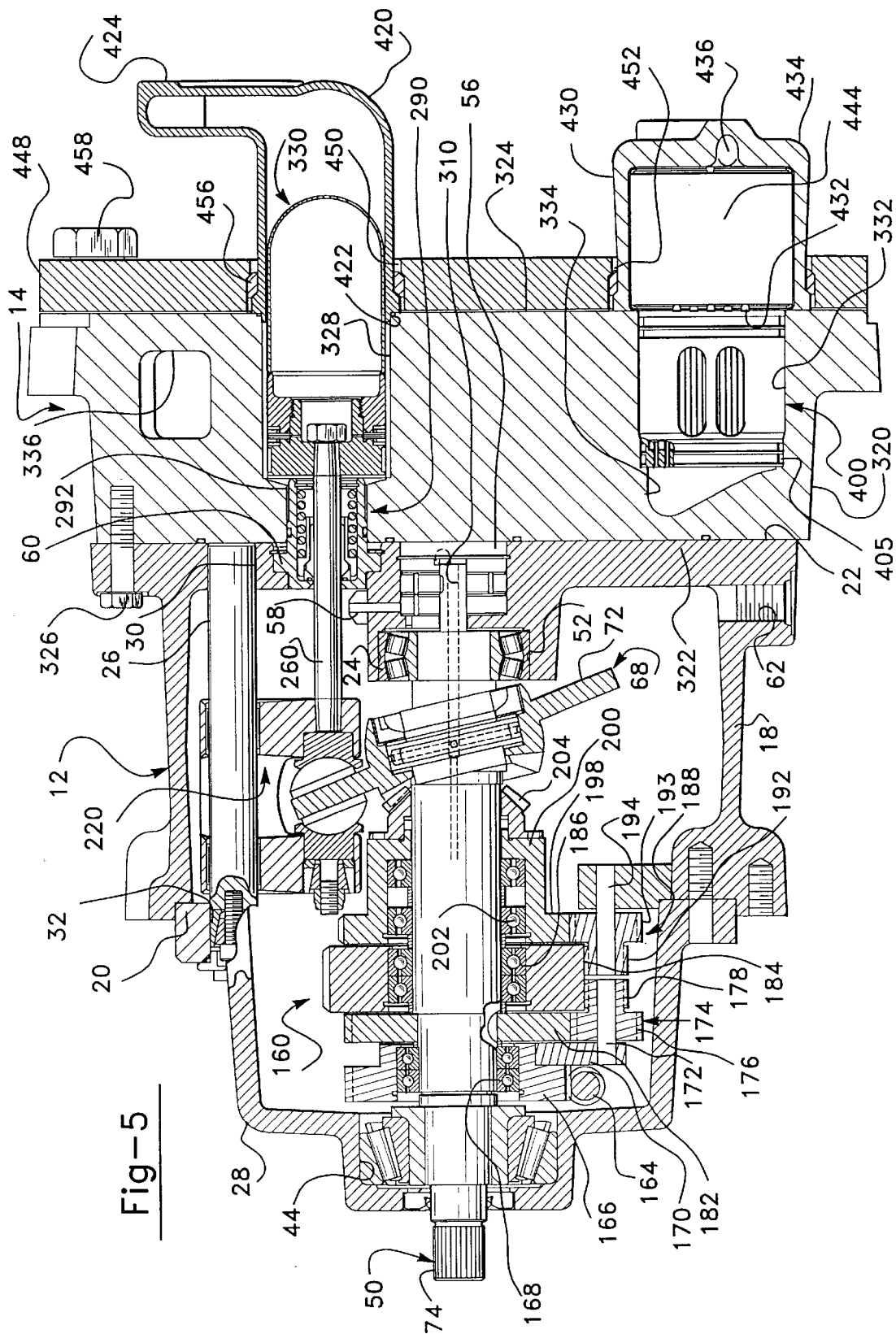
FIG. 5 is a longitudinal cross-sectional view through a Stirling engine according to this invention showing an alternate embodiment of a electric swashplate actuator in accordance with this invention.
Figure 6:
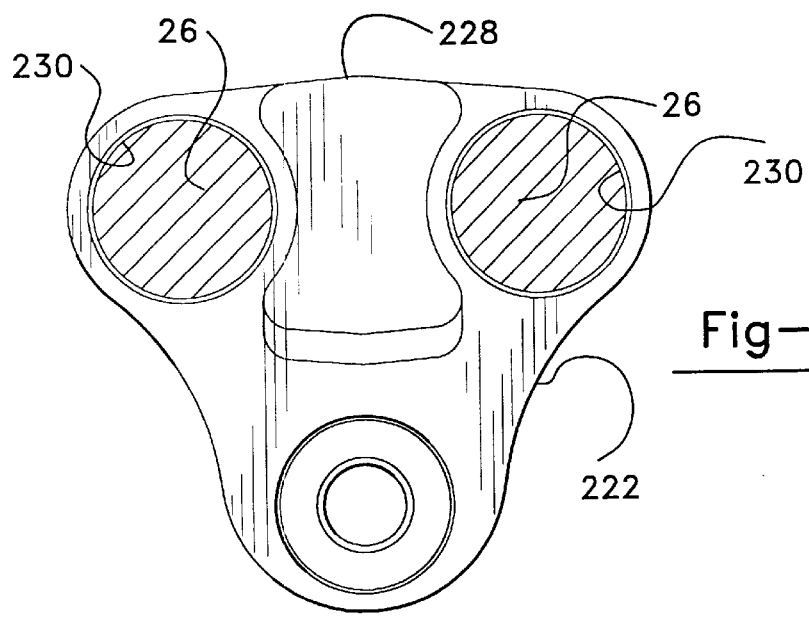
FIG. 6 is a top view of the cross head body showing the guide rods in section.
Figure 7:
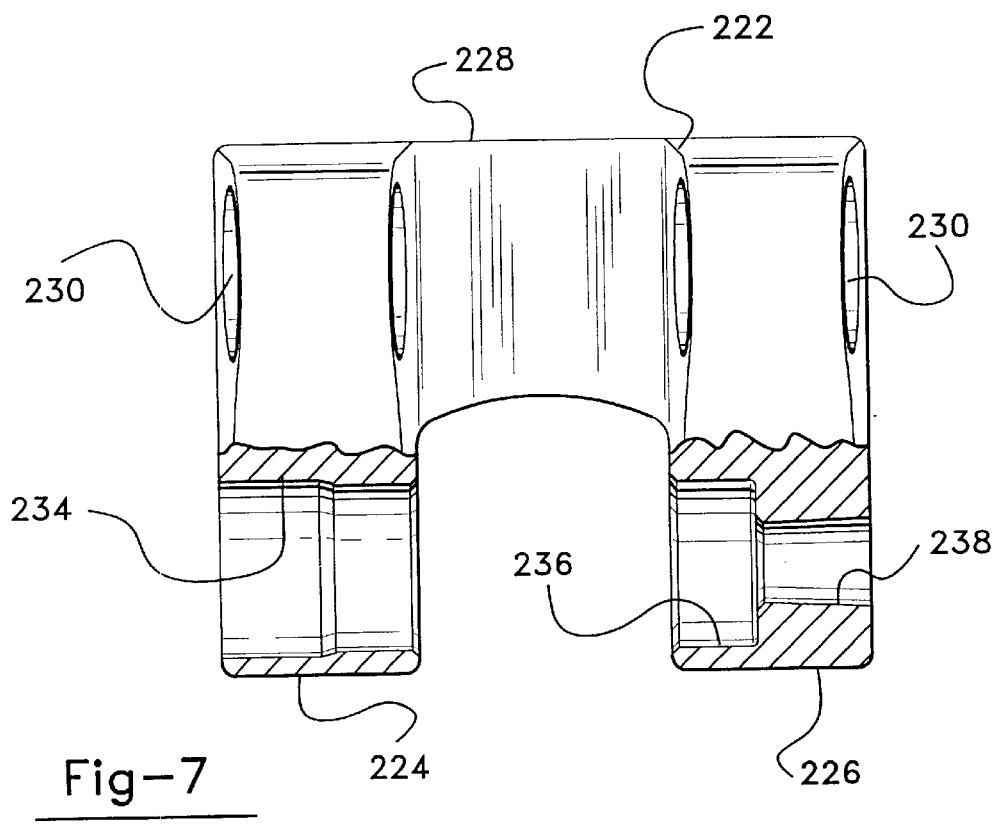
FIG. 7 is a view partially in elevation and partially in section of the cross head body shown in FIG. 6.

Now with reference to FIG. 5, a second embodiment of an electric swashplate actuator according to this invention is shown and is generally designated by reference number 160. The primary distinction of electric actuator 160 as compared with electric actuator 110 is the use of a stationary motor which avoids the requirement of slip rings for communicating power to motor windings. Electric actuator 160 includes a stationary mounted driving electric motor (not shown) which drives worm gear 164 meshing with worm wheel 166. Worm wheel 166 can rotate freely relative to drive shaft 50 through a pair of anti-friction bearings 168. Worm wheel 166 is coupled to carrier arm 170. Shaft 172 is mounted to carrier arm 170 and drives planet gear 174 having a larger diameter toothed segment 176 and a smaller diameter toothed segment 178 which can rotate relative to shaft 172. Larger diameter planet gear segment 176 meshes with fixed gear 182 which is keyed or otherwise fixed to drive shaft 50 for rotation therewith. The smaller diameter planet gear segment 178 meshes with idler gear 184 which rotate relative to the shaft on bearings 186. Idler gear 184 engages with another planet gear set having planetary gears 188 having a smaller diameter segment 192 and a larger diameter segment 193. Planet gear 188 rotates about shaft 194. Shaft 194 is grounded to drive case housing 18. Larger diameter planet gear segment 193 meshes with sun gear 198 which is fixed to collar 200 which rotates relative to shaft 50 on bearings 202. Collar 200 is connected to bevel gear 204 which meshes with swashplate bevel gear 144.

In normal operation the actuator driving motor is not turning. Accordingly, worm 164 and worm wheel 166 are both stationary relative to drive case 18. Sun gear 198 is driven by the swashplate and both rotate at the same speed. Sun gear 198 causes the driven planet gear 188 to rotate about its axis which is held stationery to the drive case 18. This in turn causes idler gear 184 to rotate relative to shaft 50. The speed of idler gear 184 relative to the shaft is dependant on the sizes of the gears used. Fixed gear 182 meshes with the planetary gear 174. Because fixed gear 182 and sun gear 198 are the same size, planet gear 174 does not revolve around the drive shaft axis. However, when worm 164 is rotated, a gear reduction acting through the two planetary gear sets causes bevel gear 204 to rotate relative to drive shaft 50, thus changing the swashplate angle.

CROSS HEAD ASSEMBLY

Details of cross head assembly 220 are best shown with references to FIGS. 2, 3 and 6 through 9. Cross head body 222 forms a caliper with a pair of legs 224 and 226 connected by center bridge 228. Each of legs 224 and 226 define a pair of guide bores 230. Preferably, journal bearings are installed within guide bores 230 such as porous bronze graphite coated bushings 232. Bushings 232 enable cross head body 222 to move smoothly along guide rods 26. Cross head leg 224 also forms stepped cross head slider cup bore 234 a portion of which is threaded. Leg 226 forms slider cup bore 236 which also has a conical section 238. Within bores 234 and 236 are positioned slider cups 240 and 242, respectively. Slider cups 240 and 242 form semi-spherical surfaces 244 and 246. Slider elements 248 and 250 also define spherical outside surfaces 252 and 254, respectively, which are nested into slider cup surfaces 244 and 246, respectively. Opposing flat surfaces 256 and 258 are formed by the slider elements and engage swashplate disc 72. As will be explained in more detail below, a hydrodynamic oil film is developed between spherical flat surfaces 256 and 258 as they bear against disc 72 to reduce friction at that interface. In a similar manner, a hydrodynamic oil film is developed between slider cup spherical surfaces 244 and 246, and slider spherical outside surfaces 252 and 254.

Figure 8:
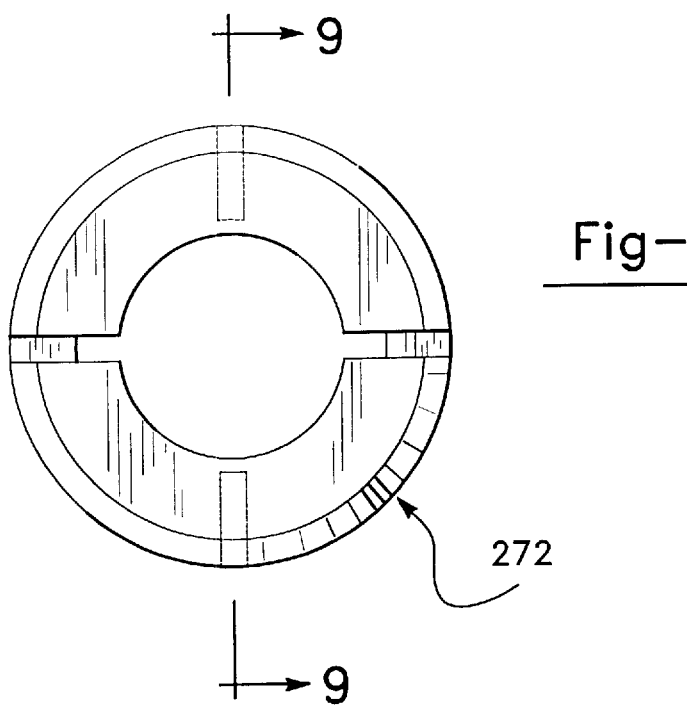
FIG. 8 is a top view of the cross head adjuster sleeve.
Figure 9:
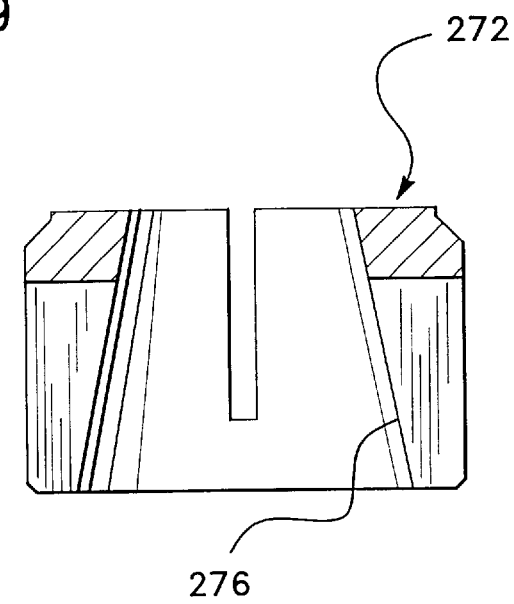
FIG. 9 is a cross-sectional view taken along line 9—9 of FIG. 8.

Piston rods 260 extend between associated pistons and slider cup 242. Piston rod 260 has a threaded end 262 which meshes with slider cup threaded bore 264. The end of piston rod 260 adjacent threaded end 262 forms a conical outside surface 266 which is tightly received by cross head bore conical section 238. Thus, the relative position between slider cup 242 and cross head leg 224 is fixed. However, slider cup 240 is provided with means for adjusting its axial position within cross head body bore 234 such that precise adjustment of the clearances of the hydrodynamic films is achievable. Slider cup 240 includes an extended threaded stud 270. In the annular space surrounded threaded stud 270 are adjuster sleeve 272 and cone 274. As best shown in FIGS. 8 and 9, sleeves 272 define an inside conical surface 276 and an outside threaded surface 273. Two perpendicular slits are formed diametrically across sleeve 272, one from the upper surface and one from the bottom surface and render the sleeve compliant in response to hoop stresses. Adjustment of the clearances for the hydro-dynamic films is provided by changing the axial position of slider cup 240 in bore 234 which is done by rotating sleeve 272, causing it to advance into slider cup bore 234, due to the threaded engagement of the sleeve in the bore. Once the gaps are adjusted properly, nut 278 is threaded onto stud 270 which forces cone 274 into engagement with sleeve conical surface 276, causing the sleeve to radially expand. This action forces the sleeve into tight engagement with cross head bore 234, keeping it from rotating, thus fixing the position of cup 240.

ROD SEALS

As shown in FIG. 1, piston rod seal assembly 290 includes housing 292 mounted within rod seal bore 60. Rod seal assembly 290 further includes spring seal actuator 294 which urges an actuating collar 296 against sealing bushing 298. Seal actuator spring 294 is maintained within housing 292 through installation of an internal C-clip 300. Due to the conical surfaces formed on collar 296 and bushing 298, seal actuator spring 294 is able to cause the bushing to exert a radially inward squeezing force against piston rod 260, thus providing a fluid seal. Preferably, collar 296 is made of an elastomeric material such as a graphite filled Teflon™ material.

Figure 1A:
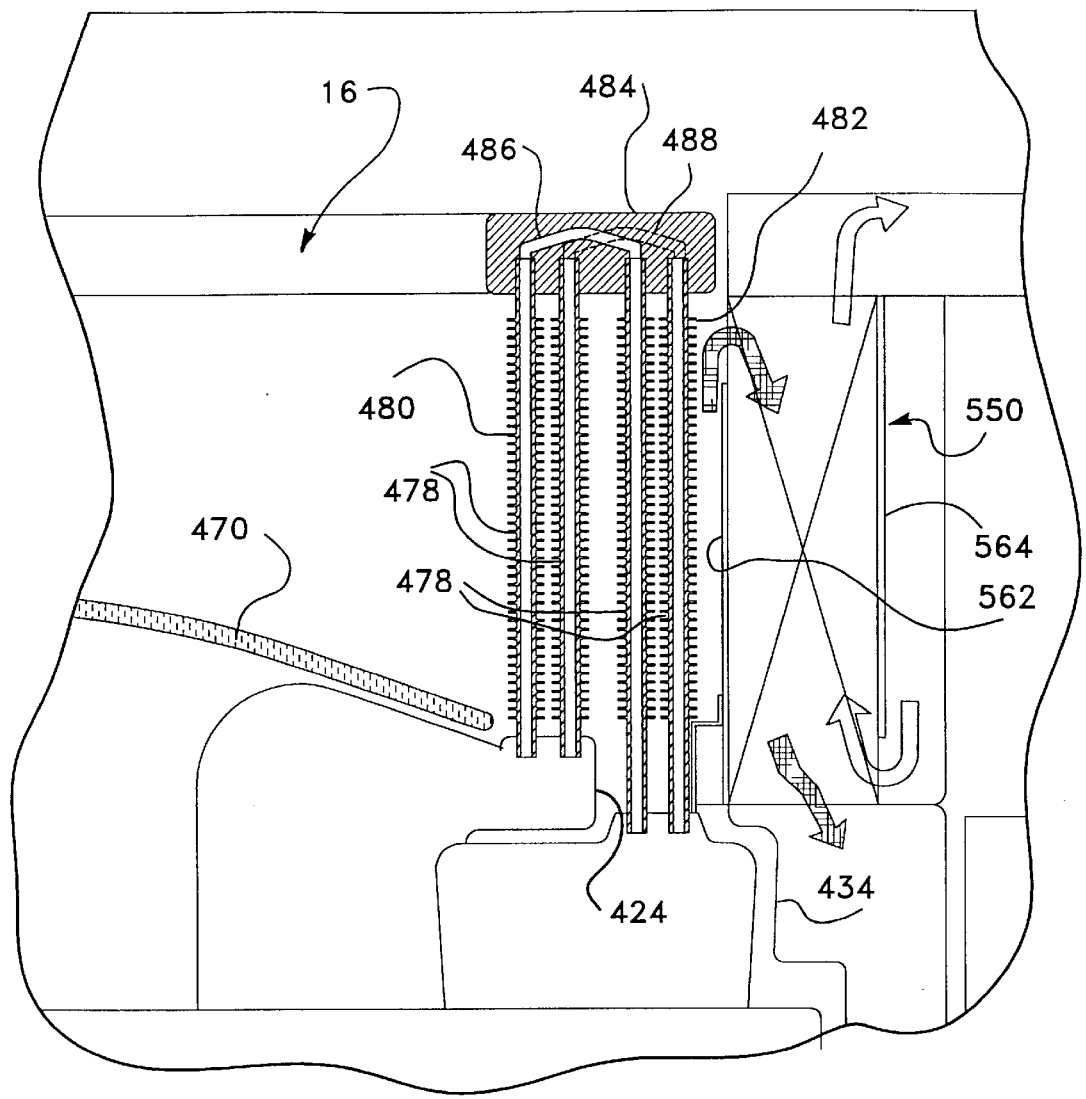
FIG. 1A is a longitudinal cross-sectional view of the heater assembly of the engine according to this invention.
Figure 1B:
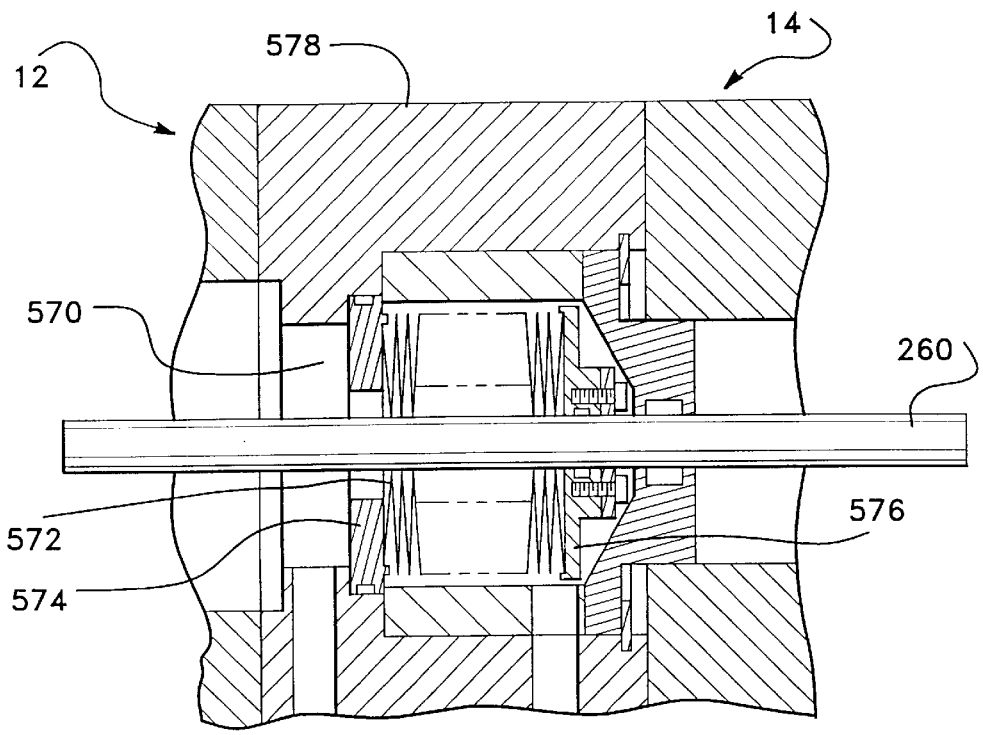
FIG. 1B is a partial cross-sectional view of a bellows rod seal incorporated into a modified form of this invention showing the bellows in an extended condition.
Figure 1C:
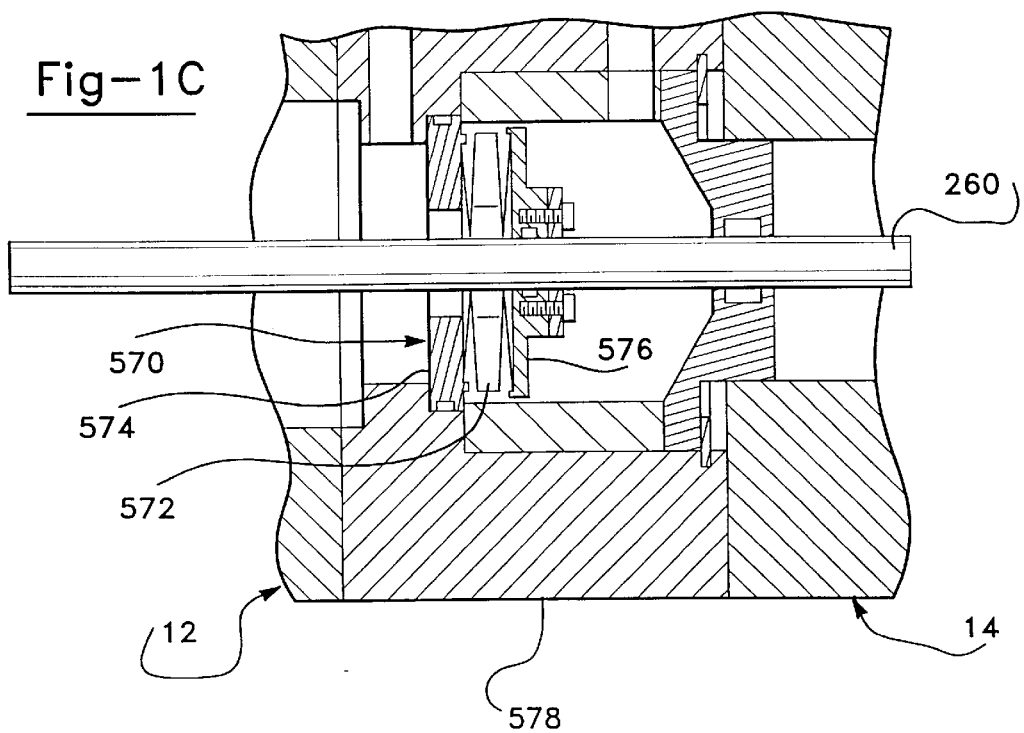
FIG. 1C is a view similar to FIG. 1B but showing the bellows compressed.
Figure 2:
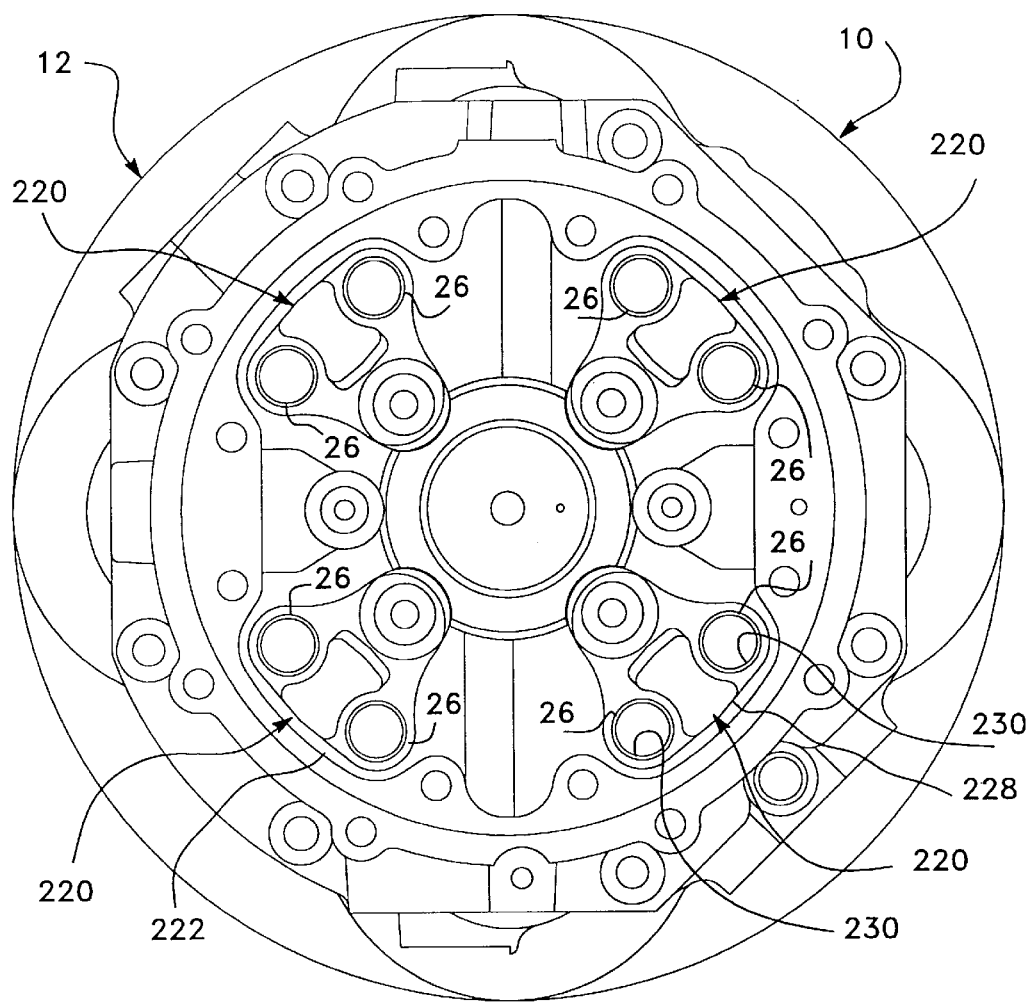
FIG. 2 is an end view of the drive case assembly taken from the output shaft end of the drive case, particularly showing the cross head components.

An alternate embodiment of a rod seal assembly is shown in FIGS. 1B and 1C. Bellows seal assembly 570 provides a hermetic rod seal. Bellows element 572 has its stationary end mounted to base 574, whereas the opposite end is mounted to ring 576. Bellows seal assembly 570 is carried by block 578 clamped between cylinder block assembly 14 and drive case assembly 12. FIG. 1C shows the bellows seal element in an extended position whereas FIG. 1C shows the element compressed. The design of engine 10 readily allows the sliding contact rod seal 290 to be replaced by bellows seal assembly 570 without substantial reworking of the engine design.

LUBRICATION SYSTEM

Oil lubrication of machine 10 takes place exclusively within drive case assembly 12. As mentioned previously, sump port 62 provides a collection point for lubrication oil within drive case housing 18. Through a sump pick-up (not shown), oil from sump port 62 enters oil pump 56 where it is forced at an outlet port through a number of lubrication pathways. Some of this oil sprays from nozzle 58 onto piston rods 260 and cross head guide rods 26. Another path for oil is through a center passage 310 within drive shaft 50. Through a series of radial passageways 312 in drive shaft 50, oil is distributed to the various bearings which support the drive shaft. Oil is also ported to swashplate 68 surfaces. The oil then splashed onto the sliding elements of the cross head assembly including slider cups 240 and 242, and slider elements 248 and 250. The exposed surfaces of these parts during their operation are coated with oil and thus generate a hydro-dynamic oil film.

CYLINDER BLOCK

Figure 10:
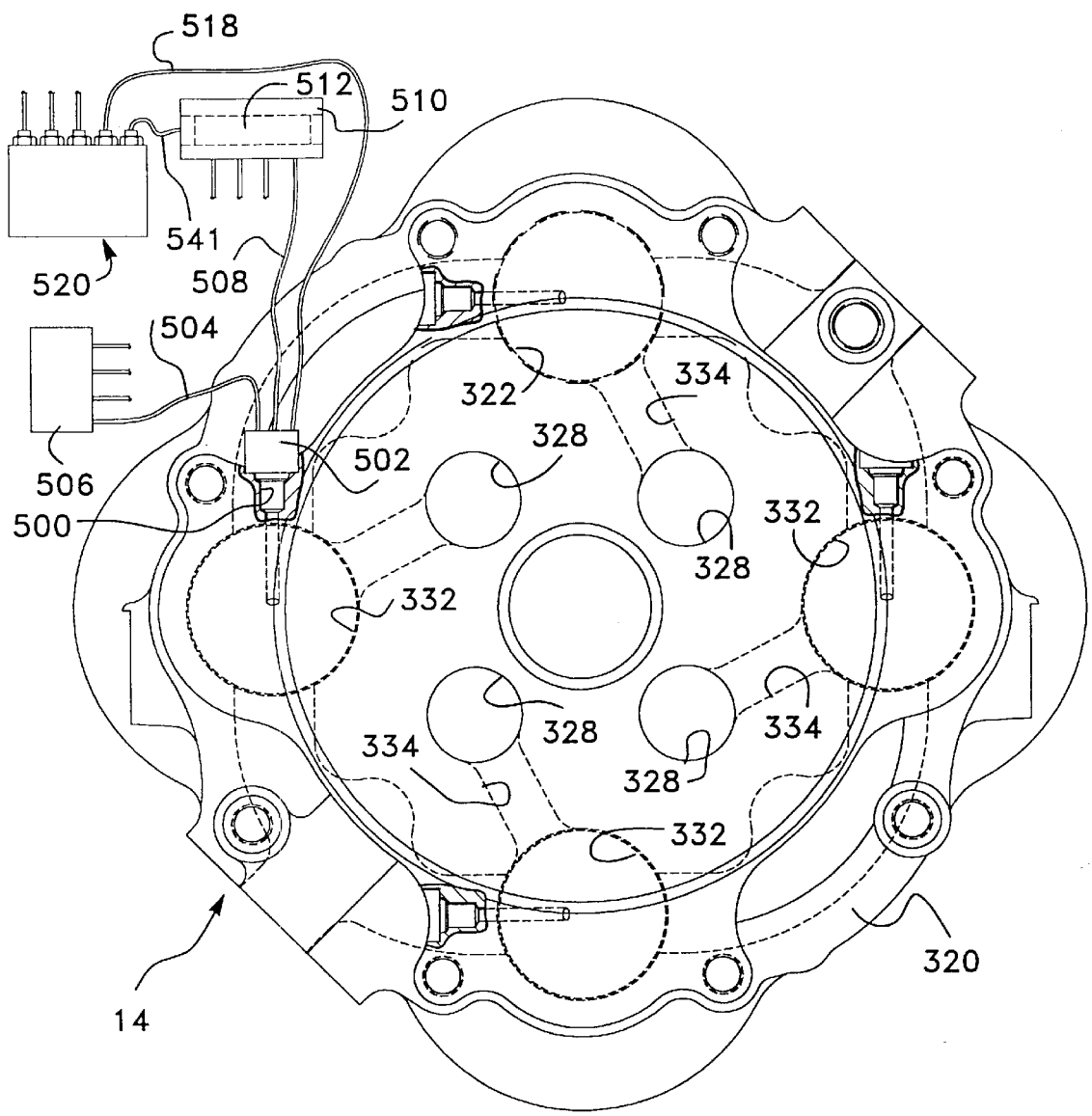
FIG. 10 is an end view of the cylinder block component taken from the end of the drive case assembly.

Cylinder block assembly 14, best shown in FIGS. 1 and 10, includes a cylinder block casting 320 having a pair of opposed parallel flat mating surfaces 322 and 324. Mating surface 322 enables cylinder block casting 320 to be mounted to drive case housing mating surface 22. Bolts 326 hold these two parts together. Stirling engine 10 according to the present invention is a four cylinder engine.

Accordingly, cylinder block casting 320 defines four cylinder bores 328 which are mutually parallel. As shown in FIG. 1, cylinder bores 328 define a larger diameter segment through which piston assembly 330 reciprocates, as well as a reduced diameter clearance bore section for rod seal assembly 290. Four cooler bores 332 are also formed in cylinder block casting 320 and are mutually parallel as well as parallel to cylinder bores 328. Cylinder bores 328 are arranged in a square cluster near the longitudinal center of cylinder block casting 320. Cooler bores 332 are also arranged in a square cluster but lie on a circle outside that of cylinder bores 328, and are aligned with the cylinder bores such that radials through the center of cooler bores 332 pass between adjacent cylinder bores. In that Stirling engine 10 is a double acting type, cylinder block casting 320 including working gas passageways 334 which connect the bottom end of cooler bore 332 to the bottom end of an adjacent cylinder bore 328 as shown in FIG. 10. Cylinder block casting 320 further forms coolant passageways 336 which provide for a flow of liquid coolant through coolant bores 332 in a diametric transverse direction.

PISTON ASSEMBLY

The first embodiment of piston assembly 330 is best shown with reference to FIGS. 11 and 12. Piston base 350 forms a conical bore 352 which receives a conical end 354 of piston rod 260. Nut 356 combined with friction at the conical surfaces maintains the piston rod fixed to piston base 350. An outer perimeter groove 358 of the piston base receives bearing ring 360 which serves to provide a low friction surface engagement with the inside of cylinder bore 328. Bearing ring 360 is preferably made of an low friction elastomeric material such as "Rulon™" material, manufactured from tetrafluoroethylene fluorocarbon. Dome base 362 is fastened onto piston base 350 through threaded engagement. Dome 364 is welded or otherwise attached to dome base 362. The combined dome base 362 and dome 364 are referred to later in this application as the piston dome and the combined piston base 350 and piston dome are referred to as the piston head. Dome 364 and dome base 362 define a hollow interior cavity 366 which is provided to thermally isolate opposing ends of piston assembly 330 and also acts as a gas accumulator, as will be described in more detail below.

Located between piston base 350 and dome base 362 are a number of elements which comprise piston ring assembly 368 which provides a gas seal around the perimeter of piston assembly 330 as it reciprocates in its bore. Sealing washer 370 is clamped between piston base 350 and dome base 362 and is flat with opposing parallel lapped (i.e. polished) surfaces. A number of radial passageways 378 are drilled through sealing washer 370. On opposing sides of sealing washer 370 are provided sealing rings 380 and 382 preferably made of "Rulon™" type elastomeric low friction material. Sealing rings 380 and 382 contact cylinder bore 328 to provide gas sealing. Acting at the inside diameter of sealing rings 380 and 382 are spring rings 384 and 386 which are split to provide radial compliance. Spring rings 384 and 386 are provided to outwardly bias sealing rings 380 and 382, urging them toward engagement with cylinder bore 328. The spaces between dome base 362 and spring ring 384 and between piston base 350 and spring ring 386 are pressure actuating cavities 398 and 399, respectively. When one of these pressure actuating cavities are sufficiently pressurized, the adjacent sealing ring is urged radially outward and into sealing engagement with cylinder bore 328.

At a number of circumferential locations, passageways 388 are drilled radially into dome base 362. In a similar manner, passageways 390 are formed within piston base 350. Passageways 388 and 390 allow working fluid to be exchanged between the area outside of the radially outermost surface of the piston head and pressure actuating cavities 398 and 399, respectively. A pair of O-rings 392 and 394 are clamped against opposing face surfaces of sealing washer 370. O-rings 392 and 394 act as gaskets which prevent working fluid from passing between sealing washer 370 and dome base 362 and between sealing washer 370 and piston base 350. At axial location aligned with sealing washer 370, piston base 350 defines one or more radial passageways 396 communicating with piston dome interior cavity 366 which functions as a gas accumulator.

As piston assembly 330 reciprocates within the cylinder bore, the two sealing rings 380 and 382 provide a gas seal preventing working fluid from leaking across the piston assembly. Sealing rings 380 and 382 are pressure actuated such that only one of the two rings is providing a primary seal at any time. Specifically, sealing ring 380 provides a gas seal when the piston is moving downwardly (i.e. toward swash plate 68) whereas sealing ring 382 provides the primary seal when the piston is moved in an upward direction. Since Stirling engine 10 is of the double acting variety, piston assembly 330 is urged to move in both its reciprocating directions under the influence of a positive fluid pressure differential across the piston assembly.

Thus, just after piston assembly 330 reaches its top dead center position, the maximum working fluid pressure for the engine is urging the piston downwardly. Working fluid at this maximum pressure passes between dome base 362 and cylinder bore 328, through passageway 388 and into pressure actuating cavity 398. This maximum pressure within passageway 388 urges sealing ring 380 downward and into tight contact with the lapped surface of sealing washer 370. This tight contact prevents working fluid from escaping pressure actuating cavity 398 between sealing ring 380 and sealing washer 370. The face of sealing washer 370 which contacts sealing ring 380 is lapped (i.e. polished) to provide an extremely smooth surface for the sealing ring to contact and to assure that working fluid will not accidentally escape between sealing ring 380 and sealing washer 370. The pressure within pressure actuating cavity 398 acts on spring ring 384 and sealing ring 380 urging them both radially outward, forcing the radially outer-most surface of sealing ring 380 into sealing contact with cylinder bore 328.

The lower sealing ring 382 however, is not fluid pressure actuated in this position. When piston assembly 330 has just left its top dead center position, the working fluid pressure below the piston is at minimum working fluid pressure for the engine. Any working fluid above this minimum pressure passes out of pressure actuating cavity 398, through passageway 388 and into the area between piston base 350 and cylinder bore 328. When the working fluid within pressure actuating cavity 398 is at or near minimum pressure, the outer surface of sealing ring 382 is not sufficiently urged against cylinder bore 328 to provide a suitable gas seal for the engine.

While spring rings 384 and 386 outwardly bias sealing rings 380 and 382 and urge them toward engagement with cylinder bore 328, the force which urges sealing rings 380 and 382 into operable sealing engagement with the cylinder bore is the pressure within pressure actuating cavities 398 and 399.

It can be seen that the opposite situation exists when the piston is just leaving the bottom dead center position. The working fluid is at maximum pressure below the piston and at minimum pressure above the piston. Working fluid at maximum pressure passes through passageway 390, into pressure actuating cavity 399 and urges sealing ring 382 into sealing engagement with cylinder bore 328. Working fluid above minimum pressure evacuates from pressure actuating cavity 399 through passageway 388 and sealing ring 380 is no longer in sealing engagement with cylinder bore 328. In the middle of a stroke, the pressure within passageways 388 and 390 and pressure actuating cavities 398 and 399 are the average of the maximum and minimum pressures for the stroke and the force urging sealing rings 380 and 382 against cylinder bore 328 is this average cycle pressure.

If the working fluid pressure within passageway 390 is less than the minimum working fluid pressure within interior cavity 366, for even an instant, this pressure differential will move sealing ring 382 away from contact with the lapped surface of sealing washer 370 and allow working fluid to escape from interior cavity 366, and pass between sealing ring 380 and sealing washer 370, through pressure actuating cavity 399 and passageway 390 and into the space between piston base 350 and cylinder bore 328. In this way, sealing rings 380 and 382 act as valves which assure that interior cavity 366 is maintained at the minimum working fluid pressure as the engine runs. Because the pressure within interior cavity 366 is maintained at the minimum working fluid pressure for the engine, sealing rings 380 and 382 are, except for those occasions where working fluid is escaping from interior cavity 366 (such as during engine startup), constantly urged toward sealing washer 370, although the force urging them toward sealing washer 370 will vary as the piston reciprocates. At the top dead center position, for instance, the maximum working fluid pressure acting through passageways 388 urges sealing ring 380 forcefully against sealing washer 370, while sealing ring 382 is only urged against the other lapped face of sealing washer 370 by the differential between the minimum working fluid pressure for that stroke and the absolute minimum working fluid pressure maintained in interior cavity 366. It can be seen that the opposite situation exists when the piston is at the bottom dead center position. In the middle of a stroke, the pressure within passageways 388 and 390 is the average of the maximum and minimum pressures for the stroke and the force urging sealing rings 380 and 382 toward sealing washer 370 is the difference between this average pressure and the minimum working fluid pressure maintained in interior cavity 366. When the engine is started, the piston may need to reciprocate several times before interior cavity 366 reaches minimum working fluid pressure.

It can be seen that the components of the first embodiment of piston assembly 330 offer substantial machining and assembly advantages over prior art devices. Because sealing washer 370 is a separate component, it is relatively easy to obtain a very smooth and flat finish on the opposing surfaces of sealing washer 370 contacted by sealing rings 380 and 382. In some prior art devices, the sealing rings were located in a groove cut into a single piece piston head. Because the side walls of the groove, which are contacted by the sealing rings, are perpendicular to the opening of the groove that provides access during the machining process, it was extremely difficult using conventional machining techniques to obtain a degree of smoothness and flatness in these surfaces that is possible with the inventive design. In addition, the majority of the bores and passageways in piston assembly 330 are machined at 90° from their major mounting surfaces, thereby simplifying the machining process.

The second embodiment of piston assembly 330 is shown in FIGS. 29 and 30. This embodiment incorporates many of the major components identified in the description of the prior embodiment, such as piston base 350, piston rod 260, bearing ring 360, dome base 362, and dome 364. In this embodiment, however, an outer perimeter groove 600 between piston base 350 and dome base 362, which is also referred to as an annular clearance space, receives a single sealing ring 602 that serves to provide a low friction surface engagement with the inside of cylinder bore 328 to inhibit the leakage of working gas across the piston. Single sealing ring 602 is preferably made of an low friction elastomeric material such as "Rulon™" material. Single sealing ring 602 provides a gas seal around the perimeter of piston assembly 330 as it reciprocates in its bore which serves to isolate the discrete volume of working gas located on one side of the piston assembly from the discrete volume of working gas located on the other side of the piston assembly.

A dome O-ring 604 is contained in a dome O-ring channel 606 in dome base 362 and is compressed between dome base 362 and single sealing ring 602. A base O-ring 608 is contained in a base O-ring channel 610 in piston base 350 and is compressed between piston base 350 and single sealing ring 602. Radially inward from single sealing ring 602 is ring actuating cavity 612. O-rings 604 and 608 prevent working fluid from passing between single sealing ring 602 and dome base 362 and between single sealing ring 602 and piston base 350, respectively. The seals provided by these O-rings isolate the working fluid in ring actuating cavity 612 from the working fluid between piston assembly 330 and cylinder bore 328.

Working fluid may pass freely between ring actuating cavity 612 and piston dome interior cavity 366 through pressure equalizing passage 614. Working fluid may also enter ring actuating cavity 612 from below piston base 350 through pressurizing passage 616, but this working fluid is prevented from leaving by check valve 618.

This embodiment of piston assembly 330 has many of the same advantages associated with the prior embodiment of the piston assembly, such as easily machined components. This embodiment of the piston assembly also achieves a gas seal by pressurizing a cavity behind a solid sealing ring. The method for pressurizing the cavity and the associated operating dynamics of the piston ring assembly are much different. In this embodiment of piston assembly 330, working fluid from beneath piston base 350 enters interior cavity 366 through pressurizing passage 616, past check valve 618 and through pressure equalizing passage 614. Within a relatively few reciprocations of piston assembly 330, interior cavity 366 has been pressurized at the maximum working fluid pressure for the engine (in contrast to the prior embodiment, where the interior cavity was pressurized at the minimum working fluid pressure). This maximum working fluid pressure urges single sealing ring 602 outward and into sealing engagement with cylinder bore 328. In contrast to the prior embodiment, the pressure within this pressure actuating cavity does not change as the piston reciprocates.

This embodiment has both a lower leakage rate and a less friction than the previous embodiment. Because single sealing ring 602 is constantly urged toward cylinder bore 328 by the maximum working fluid pressure (in contrast to the previous embodiment where the pressure changed with each piston stroke cycle), the quantity of leakage across the ring is reduced compared to the prior embodiment. In addition, because only one ring is used (rather than the two rings used in the prior embodiment) the friction produced by this embodiment is reduced compared to the prior embodiment. Because this embodiment operates in virtually a steady state mode once the interior cavity has been pressurized to maximum working fluid pressure, this embodiment is also believed to have a significantly greater mean time between failure than the previous embodiment.

COOLER ASSEMBLY

Figure 13:
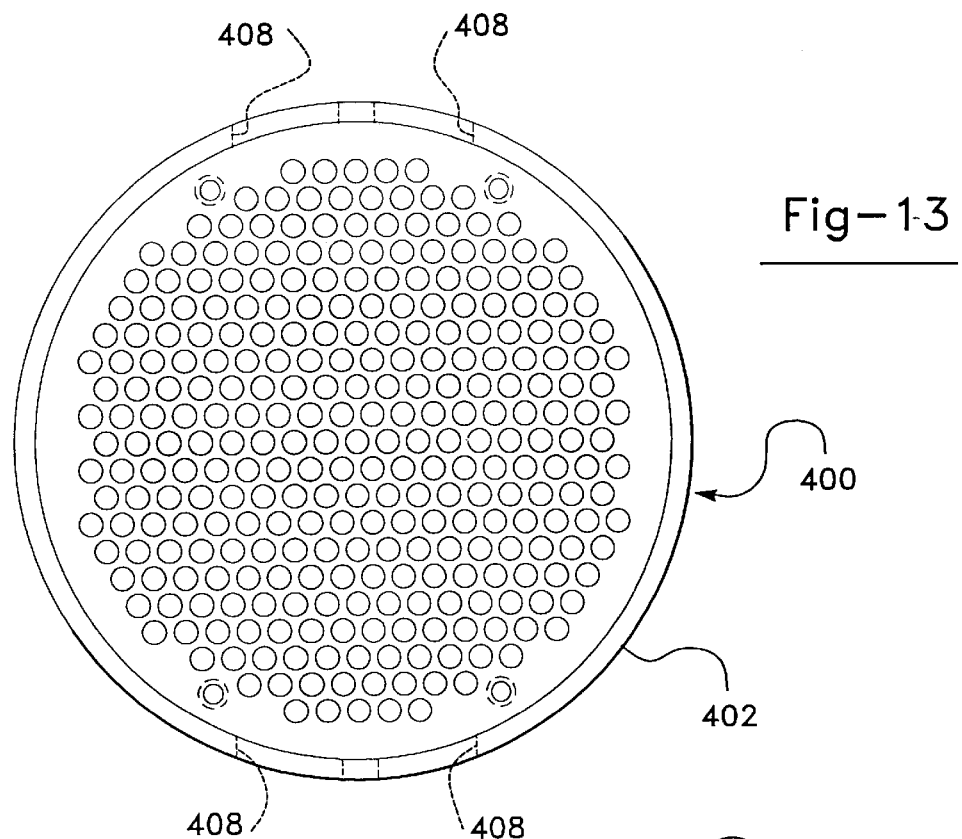
FIG. 13 is a top view of the cooler assembly.
Figure 14:
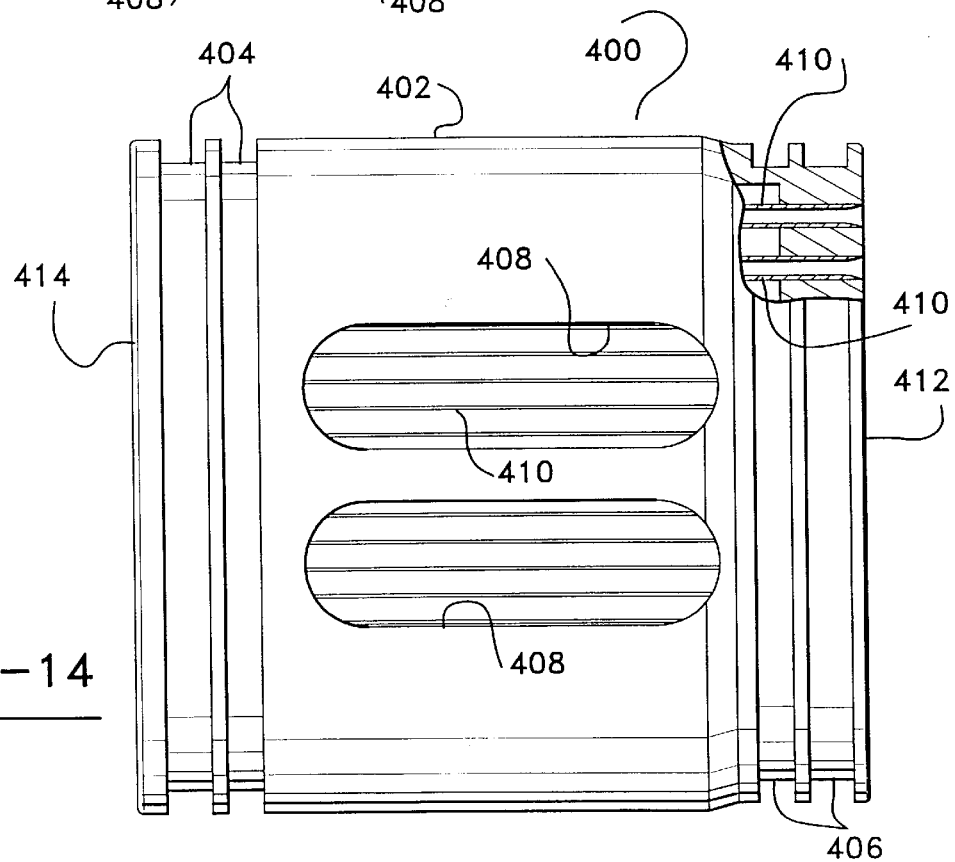
FIG. 14 is a side view partially in section of the cooler assembly.

Cooler assembly 400 is best shown with reference to FIGS. 13 and 14 and is disposed within cylinder block cooler bores 332. Cooler assembly 400 compromises a "shell and tube" type heat exchanger. As shown, housing 402 includes pairs of perimeter grooves at its opposite ends which receive sealing rings 405 for sealing the assembly within cooler bore 332. Housing 402 also forms pairs of coolant apertures 408 within housing 402. A number of tubes 410 are arranged to extend between housing ends 412 and 414. Tubes 410 can be made of various materials and could be welded or brazed in place within bores in housing ends 410 and 414. As a means of reducing flow loses of the Stirling cycle working gas, the ends of the inside diameters of tubes 410 are counter bored or flared to form enlarged openings. The Stirling cycle working gas is shuttled back and forth between the ends 412 and 414 of the cooler housing and passes through the inside of tubes 410. A coolant, preferably a liquid is pumped in a cross flow manner through block coolant passages 336 and housing apertures 408 to remove heat from the working gas.

CYLINDER EXTENSIONS

Cylinder block assembly 14 further includes tubular cylinder tops or extensions 420 which form a continuation of the cylinder block bores 328. At their open ends, tubular cylinder extensions 420 form a skirt which allows them to be accurately aligned with cylinder bores 328 by piloting. O-ring seal 422 provides a fluid seal between cylinder block bores 328 and tubular cylinder extensions 420. Cylinder extensions 420 at their opposing end form a heater tube manifold 424 which will be described in more detail below.

REGENERATOR HOUSINGS

Cup shaped regenerator housings 430 are provided which are aligned coaxially with cooler bores 332. Regenerator housings 430 define an open end 432 and a closed top 434 having manifold 436 for communication with the heater assembly. Within regenerator housing 430 is disposed regenerator 444, which in accordance with known regenerator technology for Stirling engines, is comprised of a material having high gas flow permeably as well as high thermal conductivity and heat absorption characteristics. One type of regenerator uses wire gauze sheets which are stacked in a dense matrix.

RETAINER PLATE

Figure 15:
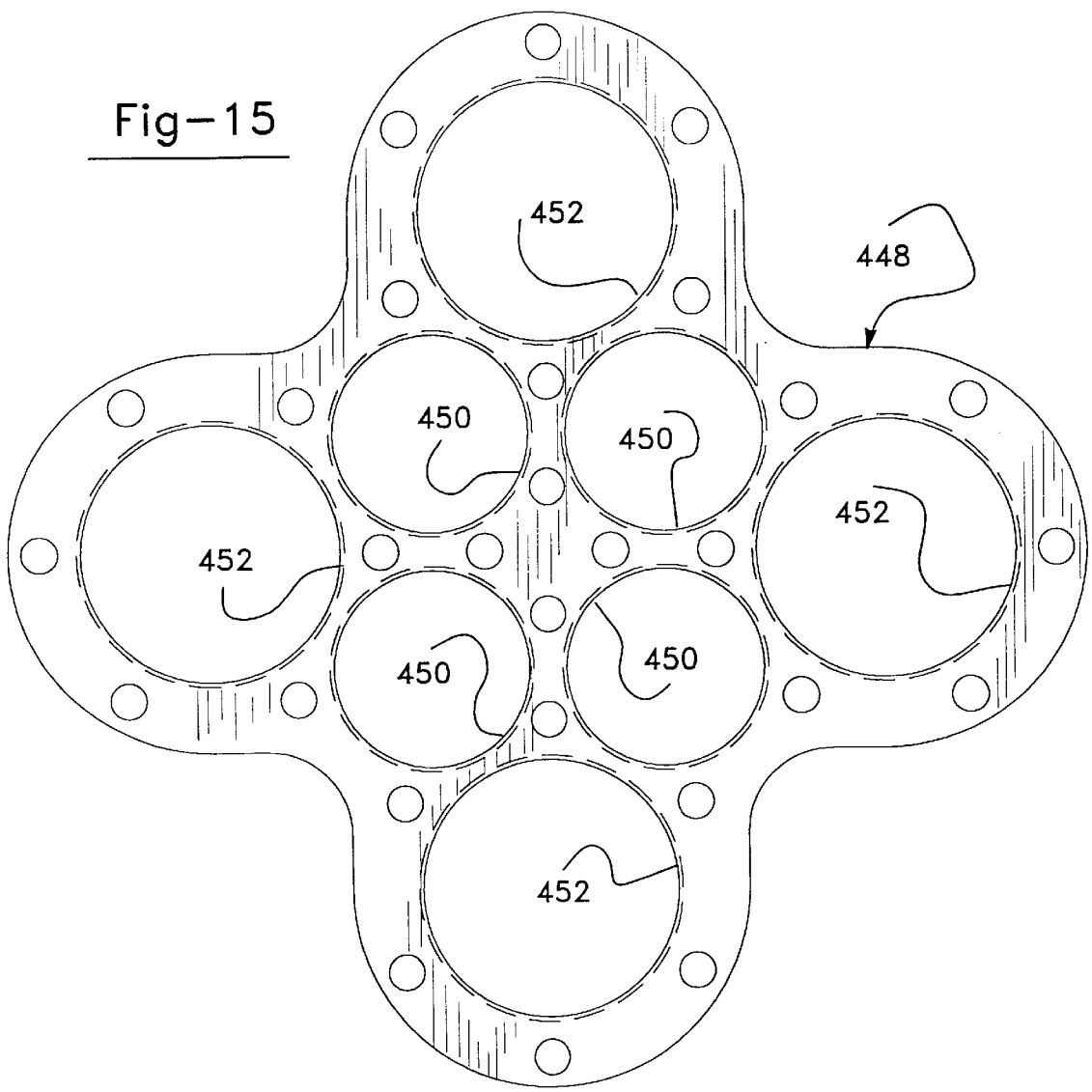
FIG. 15 is a plan view of retainer plate of this invention.
Figure 16:
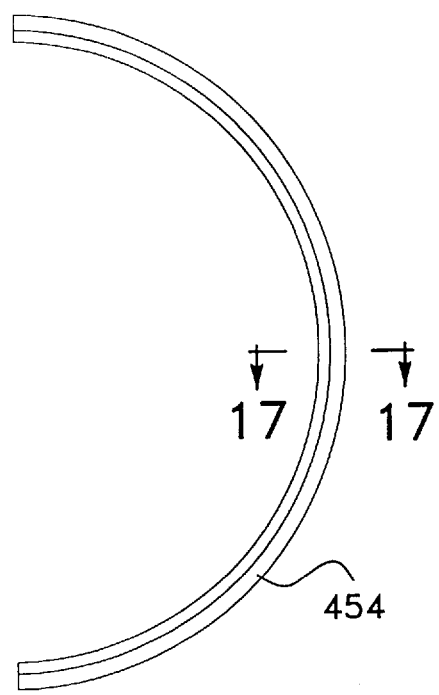
FIG. 16 is a plan view of a cylinder extension locking C-ring.
Figure 17:
FIG. 17 is a cross sectional view taken along line 17—17 from FIG. 16.

Retainer plate 448 is best shown in FIG. 15 and provides a one-piece mounting structure for retaining tubular cylinder extensions 420 and regenerator housings 430 in position. Retainer plate 448 forms cylinder extension bores 450 and regenerator housing bores 452. Cylinder extension bores 450 have a diameter slightly larger than the largest diameter at the open end of tubular cylinder extension 420 and the bore is stepped as shown in FIG. 1. In a similar fashion, regenerator housing bores 452 are also enlarged with respect to the open end of regenerator housing 430 and are also stepped. Retainer plate 448 is designed so that the open ends of tubular cylinder extensions 420 and regenerator housings 430 can be inserted as an assembly through their associated plate bores. This is advantageous since the configuration of cylinder extension 420 and the heater assembly 16 attached to the cylinder extension and regenerator housing 430 would not permit top mounting. For assembly, retainer plate 448 is first positioned over cylinder extensions 420 and regenerator housings 430. Thereafter, semi-circular cylinder extension locking C-rings 454 shown in FIGS. 1, 16 and 17, and regenerator housings locking C-rings 456 are placed around the associated structure and allow retaining plate 448 to clamp these components against cylinder block mounting face 324, in a manner similar to that of an internal combustion engine valve stem retainer. Mounting bolts 458 fasten retainer plate 448 to cylinder block body 320. The use of a one-piece retaining plate provides rapid assembly and securely mounts the various components in an accurately aligned condition.

Cylinder extension 420 interact with cylinder block mating surface 324 to accurately pilot the center of the cylinder extensions with respect to cylinder block cylinder bores 328. However, the need for such accurate alignment does not exist for regenerator housings 430, and therefore, a face seal is provided allowing some degree of tolerance for misalignment between the regenerator housings and cooler bores 332. In this way, assembly is simplified by reducing the number of ports which must be simultaneously aligned.

HEATER ASSEMBLY

Figure 18:
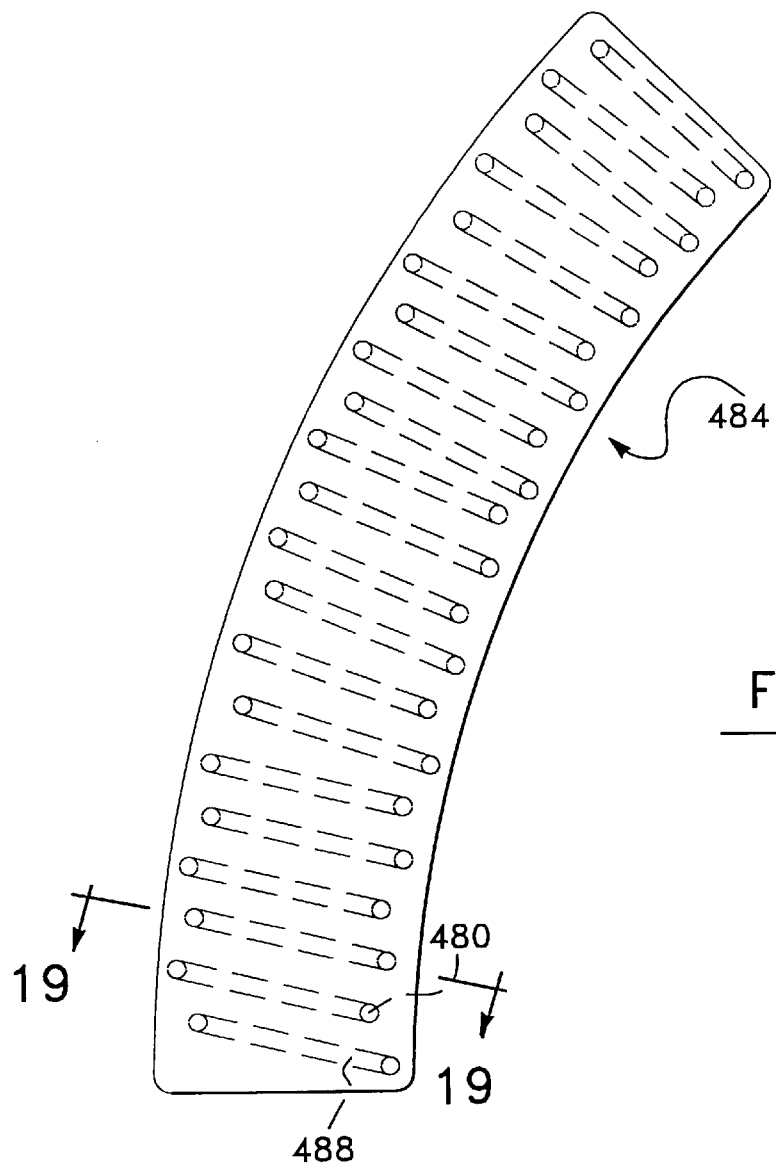
FIG. 18 is a plan view of a manifold segment of the heater head assembly of this invention.
Figure 19:
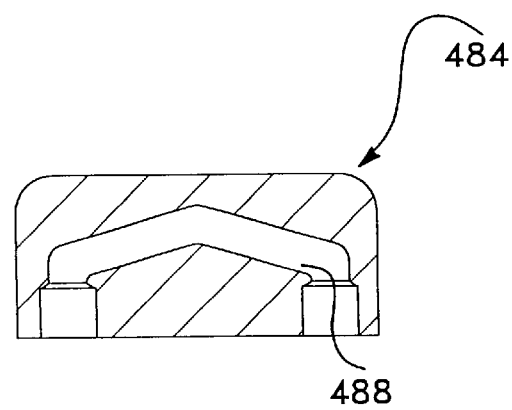
FIG. 19 is a cross-sectional view taken along line 19—19 of FIG. 18.

Heater assembly 16 provide a means of inputting thermal energy into the Stirling cycle working gas and is shown in FIG. 1A. A combustor (not shown) is used to burn a fossil fuel or other combustible material. Alternatively, heat can be input from another source such as concentrated solar energy, etc. In Stirling engine 10 according to this invention, combustion gases flow axially toward central heat dome 470 where it is deflected to flow in a radial direction. An array of heater tubes 478 is arranged to conduct heat from the hot gas as it flows radially out of the engine. Heat tubes 478 are arranged to form an inner band 480 and an outer band 482. The tubes of inner band 480 have one end which fits within cylinder extension manifold 424 and the opposite end fitting into heater tube manifold segment 484. As best shown in FIGS. 18 and 19, the tubes of inner bands 480 are arranged in a staggered relationship as are the tubes of outer band 482, thus enhancing heat transfer to the heater tubes. Manifold segment 484 has internally formed passageways such that the inner most tubes of inner band 480 are connected with the inner-most band of outer tubes 482 through passageways 486. In a similar manner the outer groups of inner and outer bands are connected via internal passageways 488. The tubes of the outer band 482 are connected with manifold segment 484 and the regenerator housing manifold 436.

Each of tubes 478 defining heater tube inner band 480 and outer band 482 are identical except the outer band tubes are longer. Tubes 478 are preferably made from a metal casting process which provides a number of benefits. The material which can be used for cast heater tubes can be selected to have higher temperature tolerance characteristics as compared with the deformable thin-walled tubes typically used. As shown in FIGS. 20 and 21, heater tubes 478 have projecting circular fins 492. The cross-section of the fins shown in FIG. 21 reveals that they can have a thickness which decreases along their length with rounded ends. Various other cross-sectional configurations for fins 492 can be provided to optimize heat transfer characteristics. In addition to optimizing the longitudinal cross-sectional shape of the fins, modifications of their perimeter shape can be provided. FIG. 22 shows a circular outside perimeter shape for fins 492. Using a casting process for forming heater tubes 478 other shapes to be provided. For example, FIG. 23 shows a general dart shaped platform configuration. The configuration can be tailored to the gas flow dynamics which occur around the tubes. For example, it is known that for tubes arranged perpendicular to the gas flow direction, the upstream side surface 496 of the tubes tends to absorb more heat than the downstream or back side 498 of the tubes. For conventional tubes, this leads to significant thermal gradients which produce mechanical stresses on the heater tubes which can in turn lead to their failure over time. The platform provided in FIG. 23 may be advantageous to increase heat adsorption on the backside 498 to maintain more constant tube temperature for gas flowing in the direction of arrow 492 since more fin area is exposed on the downstream side where heat transfer is less efficient.

PRESSURE BALANCING

As in conventional Stirling cycle engines employing multiple double acting cylinders, in the case of the four cylinder engine shown in connection with this invention, four distinct isolated volumes of working gas such as hydrogen or helium are present in the engine. One of the volumes is defined by the expansion space above piston dome 364 which in turn flows through heater tubes 478, regenerator 444, cooler assembly 400, and cylinder block passageway 334 to the lower end of an adjacent cylinder bore 328. In a similar manner, three additional discrete volumes of gas are defined. Each of the gas volumes undergo shuttling between a compression space defined at the lower end of piston cylinder bore 28 in cylinder block casting 320, and an expansion space defined within tubular cylinder extension 420. Thus, the gases are shuttled between these spaces as occurs in all Stirling engines. Gases passing through heater assembly 16 absorb heat and expand in the expansion space and are cooled by cooler assembly 400 before passing into the compression space.

In order to minimize imbalances in the operation of engine 10, the mean pressure of the four distinct gas volumes needs to be equalized. This is achieved through the use of working fluid ports 500 positioned at the lower-most end of cylinder block cooler bore 332, best shown in FIG. 10, each of which are exposed to the separate gas volumes. Fitting 502 is installed in a port and from it are three separate tube elements. A first small capillary tube 504 communicates with pressure transducer block 506 having individual pressure transducers for each of the gas volumes, enabling those pressures to be measured. Capillary tube 508 communicates with manifold block 510 having an internal cavity which connects each of the individual capillary tubes 508 together. The function of manifold block 510 is to "leak" together the volumes for equalization of any mean pressure imbalances which may occur between them. A low restriction passageway connecting these cycle volumes together would unload the engine and would constitute an efficiency loss. Therefore, tubes 508 have a restricted inside diameter and thus the flow rate through these tubes is restricted. However, over time, pressure imbalances are permitted to equalize through fluid communication between the volumes.

UNLOADER VALVE

Figure 24:
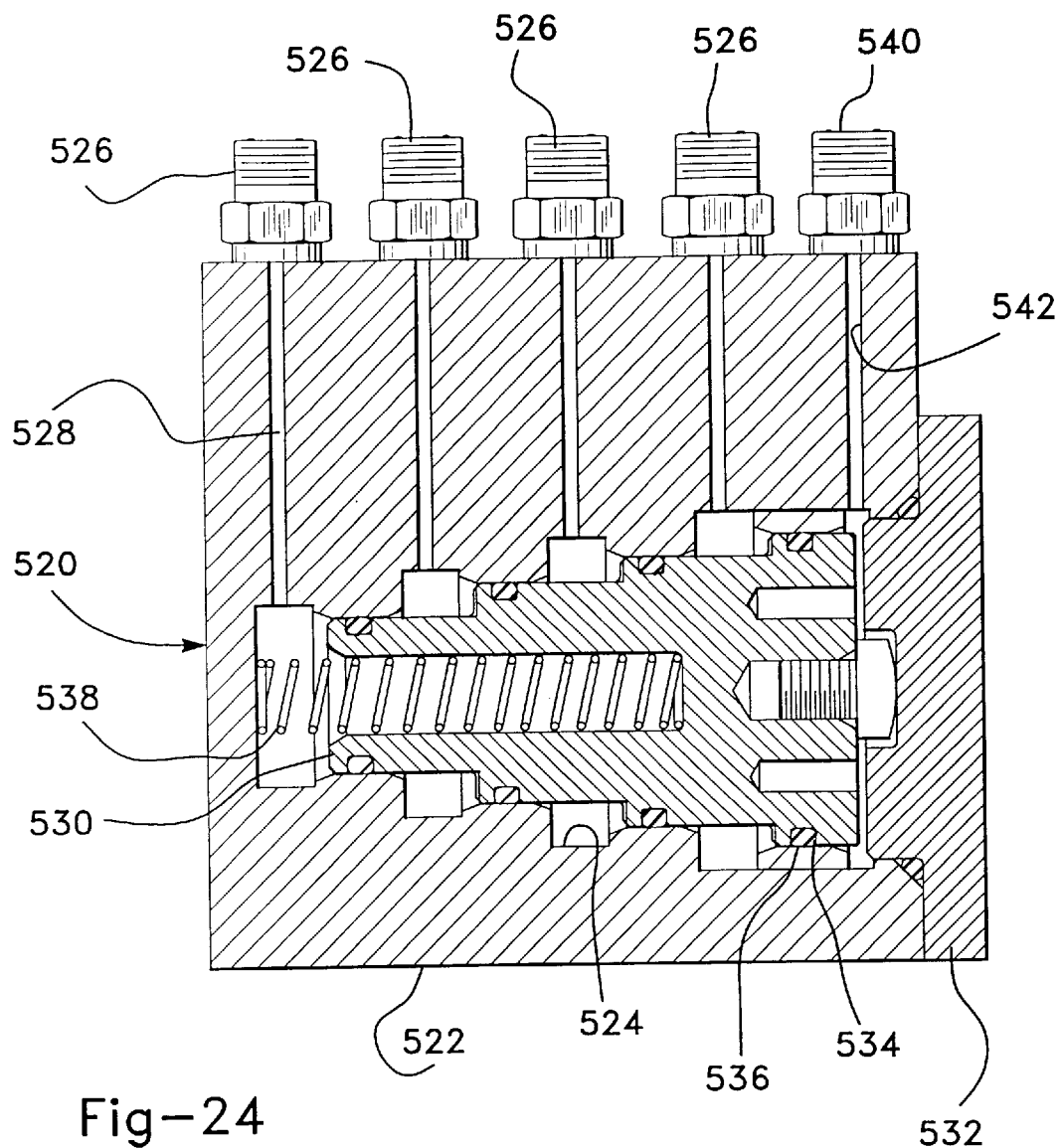
FIG. 24 is a cross-sectional view through the unloader valve.

In the event of a mechanical failure or other condition which leads to a leakage of working gas from the engine, a severe imbalance condition can result. For example, if only one or more of the enclosed gas volumes leaks to atmosphere, potentially destructive loads would be placed on the mechanical components of engine 10. In order to preclude this from occurring, conduits 518 communicate with unloader valve 520 as shown with reference to FIGS. 10 and 24. As shown, unloader valve includes housing 522 within internal stepped bore 524. A series of pipe fittings 526 are provided which communicate with individual diameter sections of stepped bore 524 via passageways 528. Each of fittings 526 communicates with the separate gas volumes via conduits 518. Spool 530 is positioned within stepped bore 524 and is maintained in the housing by cap 532. A series of grooves 534 provided on the various diameter sections of spool 530 and retain O-rings 536. Spool 530 is urged in the right-hand direction as viewed in FIG. 24 by coil spring 538. An additional port is provided at fitting 540 which communicates with manifold block 510 via conduit 541 and is exposed to the engine mean pressure. This pressure signal passes through passageway 542 and acts on the full end area of spool 530. During normal engine operation, individual diameter sections of stepped bore 524 are exposed to the mean pressure of the four enclosed gas volumes. Each of these pressure signals produces a resultant net force on spool 530 urging it toward the right-hand direction which is assisted by the compliance of spring 538. In a normal operating condition, these pressures produce forces added to the spring compliance pushing shuttle spool 530 to the right-hand position as shown. However, in the event of the mechanical failure of engine 10 causing a leakage of working fluid, one (or more) of the passageways 528 experiences a loss in pressure. In this event, the net force acting to retains spool 530 in position is reduced and the equilibrium condition is unbalanced to move the shuttle in the lefthand direction under the influence of the engine mean cycle pressure through passageway 542. When this occurs, the various O-rings 536 unseat from their associated sealing surfaces and thus all of the gas volumes are vented together inside housing 522, rendering the engine incapable of producing mechanical output power and thus protecting the engine from destructive imbalance forces.

AIR PREHEATER

Figure 25:
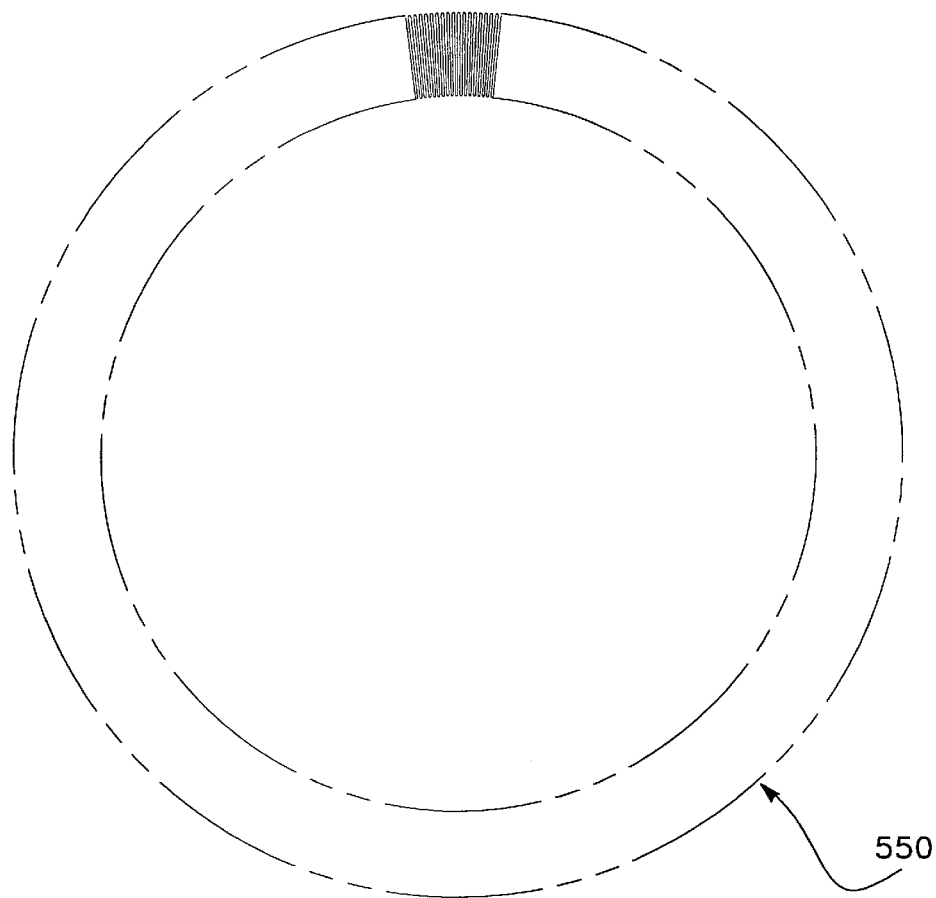
FIG. 25 is a top view of the air preheater.
Figure 26:
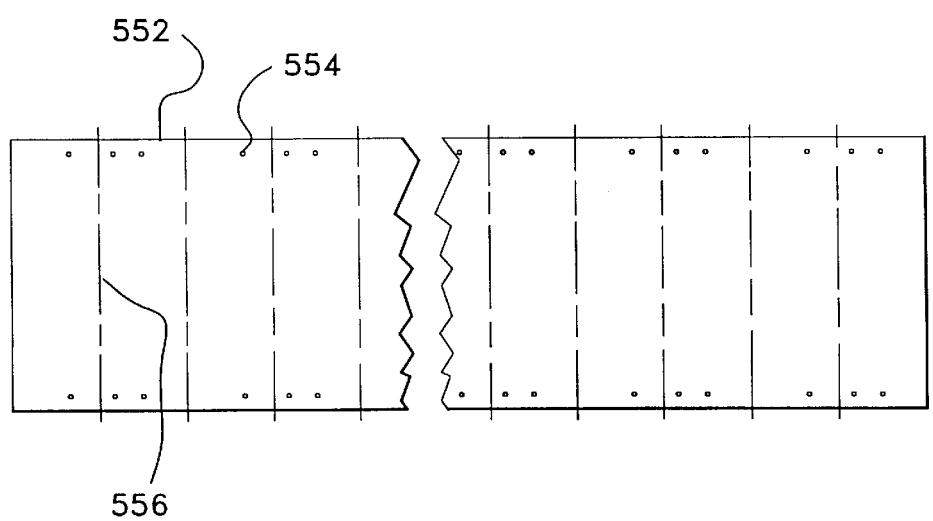
FIG. 26 shows a sheet of metal material from which the air preheater is formed.

Combustion gases which pass through heater tube inner and outer banks 480 and 482 still are at an elevated temperature and have useful heat energy which can be recovered to enhance the thermal efficiency of engine 10. This is achieved through the use of air preheater 550 which has an annular ring configuration and surrounds heater tube outer bank 482. Air preheater 550 is formed from sheet metal stock having a high temperature capability. The stock first begins with a flat sheet 552 which may have local deformations as shown in FIG. 26 such as dimples 554, and is bent in an accordion-like fashion about fold lines 556. After sheet 552 is corrugated, its ends are welded to define the annular preheater configuration shown in FIGS. 25, 27, and 28. FIG. 28 shows that these corrugations are pinched together and welded at the axial ends of the preheater. Upper end 558 is formed with adjacent layers pinched together and welded as shown. Bottom end 560 has layers which are pinched together but alternate with those pinched together at top end 558. This arrangement provides the gas flow direction shown in FIG. 1A in which combustion gas flow is shown by cross-hatched arrows and fresh combustion air by clear arrows. Combustion gases passing through heater assembly 16 are deflected by baffle 562. The hot gases then enter the inside diameter of air preheater 550. Since the upper end 558 of these wraps are sealed, the gas is forced to flow downwardly as shown by the arrows. After passing through air preheater 550 these gases are vented or are further treated downstream. Fresh combustion air enters at the radially outer side of air preheater 550 and is constrained to flow in an axial direction through baffle 564. Combustion inlet air travels upwardly in an axial direction as shown by the upward directed arrows and is thereafter conveyed to a fuel combustor (not shown). Heat is transferred through the thin sheet metal forming air heater 550.

As a means of further enhancing thermal efficiency of engine 10, the inside surface of air preheater 550 exposed to combustion gases can be coated with a catalyst material such as platinum or palladium, or other catalyst materials. This thin layer 566 encourages further combustion of hydrocarbons within the combustion gases which has the two-fold benefits of reducing emissions as well as increasing the combustion gas temperature thereby increasing combustor inlet air temperature and efficiency.

It is to be understood that the invention is not limited to the exact construction illustrated and described above, but that various changes and modifications may be made without departing from the spirit and scope of the invention as defined in the following claims.

We claim:

1. A piston assembly for reciprocation within a cylinder bore of a double-acting hot gas engine including a double-acting Stirling engine, said piston assembly comprising:
    a piston rod,
    a piston head, attached to said piston rod, forming an annular clearance space, having connected base and dome sections and a radially outer-most surface, said dome section having an interior cavity,
    a sealing washer located in said annular clearance space, having first and second opposed flat surfaces and radially inner-most and outer-most surfaces,
    a first sealing ring, formed of elastic low friction material, having radially inner-most and outer-most surfaces, located in said annular clearance space between said sealing washer and said base section of said piston head and positioned in direct engagement with said first opposed flat surface of said sealing washer, said radially inner-most surface of said first sealing ring separated from said sealing washer and said base section of said piston head by a first actuating cavity, said first sealing ring and said base section of said piston head forming a first ring passageway allowing working fluid to be exchanged between said first actuating cavity and said cylinder bore, and
    a second sealing ring, formed of elastic low friction material, having radially inner-most and outer-most surfaces, located in said annular clearance space between said sealing washer and said dome section of said piston head and positioned in direct engagement with said second opposed flat surface of said sealing washer, said radially inner-most surface of said second sealing ring separated from said sealing washer and said dome section of said piston head by a second actuating cavity, said second sealing ring and said dome section of said piston head forming a second ring passageway allowing working fluid to be exchanged between said second actuating cavity and said cylinder bore.

2. A piston assembly according to claim 1 wherein said first ring passageway comprises a channel in said base section of said piston head open to said annular clearance space and extending between said first actuating cavity and said radially outer-most surface of said piston head and said second ring passageway comprises a channel in said dome section of said piston head open to said annular clearance space and extending between said second actuating cavity and said radially outer-most surface of said piston head.

3. A piston assembly according to claim 1 further including means for biasing said first sealing ring radially outward and means for biasing said second sealing ring radially outward.

4. A piston assembly according to claim 3 wherein said means for biasing said first sealing ring comprises a first split spring ring located within said first actuating cavity, contacting said radially inner-most surface of said first sealing ring and urging said radially inner-most surface of said first sealing ring radially outward and said means for biasing said second sealing ring comprises a second split spring ring located within said second actuating cavity, contacting said radially inner-most surface of said second sealing ring and urging said radially inner-most surface of said second sealing ring radially outward.

5. A piston assembly according to claim 1 wherein said sealing rings are closed rings with rectangular radial cross sections.

6. A piston assembly according to claim 1 wherein said sealing rings are manufactured from tetrafluoroethylene fluorocarbon.

7. A piston assembly according to claim 1 wherein said interior cavity and said radially outer-most surface of said sealing washer are connected by a cavity passageway.

8. A piston assembly according to claim 1 further including a first gasket between said sealing washer and said base section of said piston head and a second gasket between said sealing washer and said dome section of said piston head.

9. A piston assembly according to claim 1 further including a bearing ring located in an outer perimeter groove in said piston head, said bearing ring formed of low friction material.

10. A piston assembly for reciprocation within a cylinder bore of a double-acting hot gas engine including a double-acting Stirling engine, said piston assembly comprising:
    a piston rod,
    a piston head, attached to said piston rod, forming an annular clearance space and having a radially outer-most surface,
    a sealing washer, positioned within said annular clearance space, having first and second opposed flat faces and radially inner-most and outer-most surfaces,
    first and second closed sealing rings,
    said first sealing ring positioned between said sealing washer and said piston head, said first sealing ring, said sealing washer and said piston head forming a first actuating cavity, said first sealing ring positioned in a sealing relationship with said first opposed flat face of said sealing washer, said first sealing ring and said piston head forming a first ring passageway allowing working fluid to be exchanged between said first actuating cavity and said cylinder bore, and
    said second sealing ring positioned between said sealing washer and said piston head, said second sealing ring, said sealing washer and said piston head forming a second actuating cavity, said second sealing ring positioned in a sealing relationship with said second opposed flat face of said sealing washer, said second sealing ring and said piston head forming a second ring passageway allowing working fluid to be exchanged between said second actuating cavity and said cylinder bore.

11. A piston assembly according to claim 10 wherein said piston head has an interior cavity and said sealing washer has a cavity passageway connecting said interior cavity and said radially outer-most surface of said sealing washer.

12. A piston assembly according to claim 10 wherein said sealing washer is a closed ring, said piston head comprises joined base and dome sections and said base and dome sections are joined after said base and dome sections are placed adjacent to different opposing flat surfaces of said sealing washer.

13. A piston assembly according to claim 10 wherein said first ring passageway comprises a channel in said piston head open to said annular clearance space and extending between said first actuating cavity and said radially outermost surface of said piston head and said second ring passageway comprises a channel in said piston head open to said annular clearance space and extending between said second actuating cavity and said radially outer-most surface of said piston head.

14. A piston assembly for reciprocation within a cylinder bore of a double-acting hot gas engine including a double-acting Stirling engine, said piston assembly comprising:

a piston rod, a piston head attached to said piston rod, having an interior cavity and forming an annular sealing ring groove, said annular sealing ring groove having walls and a radially inner-most surface, a sealing ring, formed of elastic low friction material, located within said annular sealing ring groove, having radially inner-most and outer-most surfaces, separated from said radially inner-most surface of said annular sealing ring groove by an actuating cavity, said actuating cavity connected to said interior cavity by a cavity passageway, two gaskets, located on opposing sides of said sealing ring within said annular sealing ring groove, said gaskets contacting said walls of said annular sealing ring groove and said sealing ring and substantially inhibiting the passage of working fluid into or out of said actuating cavity between said sealing ring and said walls of said annular sealing ring groove, and pressurization means for positively pressurizing said actuating cavity, thereby causing said radially outer-most surface of said sealing ring to be urged into constant sealing engagement with said cylinder bore of said engine.

15. A piston assembly according to claim 14 wherein said pressurization means includes means for positively pressurizing said interior cavity.

16. A piston assembly according to claim 15 wherein said means for positively pressurizing said interior cavity includes a one-way check valve and a pressurizing passageway between said interior cavity and said cylinder bore, said one-way check valve and said pressurizing passageway allowing working fluid to enter said interior cavity from said cylinder bore when the pressure of said working fluid between said one-way check valve and said cylinder bore exceeds the pressure of said working fluid within said interior cavity and substantially inhibiting working fluid from leaving said interior cavity when the pressure of said working fluid between said one-way check valve and said cylinder bore is less than the pressure of said working fluid within said interior cavity.

17. A piston assembly according to claim 14 wherein said sealing ring is a closed ring with a rectangular radial cross section.

18. A piston assembly according to claim 14 wherein said sealing ring is manufactured from tetrafluoroethylene fluorocarbon.

19. A piston assembly according to claim 14 further including a bearing ring located in an outer perimeter groove in said piston head, formed of low friction material.

20. A piston assembly for reciprocation within a cylinder bore of a double-acting engine including a double-acting Stirling engine, said piston assembly comprising:

a piston rod, a piston head, connected to said piston rod, forming an annular sealing ring groove, said annular sealing ring groove having a radially inner-most surface, a sealing ring, formed of elastic low friction material, located within said annular sealing ring groove, having radially inner-most and outer-most surfaces, said radially inner-most surface of said sealing ring separated from said radially inner-most surface of said annular sealing ring groove by an actuating cavity, and actuating cavity pressurization means for positively pressurizing said actuating cavity, thereby causing said radially outer-most surface of said sealing ring to be constantly urged into sealing engagement with said cylinder bore of said engine.

21. A piston assembly according to claim 20 wherein said piston head has an interior cavity and said actuating cavity pressurization means includes a cavity passageway connecting said interior cavity and said actuating cavity and interior cavity pressurization means for pressurizing said interior cavity.

22. A piston assembly according to claim 21 wherein said interior cavity pressurization means includes a one-way check valve and a pressurizing passageway between said interior cavity and said cylinder bore, said one-way check valve and said pressurizing passageway allowing working fluid to enter said interior cavity from said cylinder bore when the pressure of said working fluid in said cylinder bore exceeds the pressure of said working fluid within said interior cavity and substantially inhibiting working fluid from leaving said interior cavity when the pressure of said working fluid in said cylinder bore is less than the pressure of said working fluid within said interior cavity.

23. A piston assembly according to claim 20 wherein said sealing ring is a closed ring having two opposing flat surfaces contacting said piston head, said piston head has joined base and dome sections and said base and dome sections are joined after said base and dome sections are placed adjacent to different said opposing flat surfaces of said sealing ring.

* * * * *